United States Patent [19]

Nagao et al.

[11] Patent Number: 5,064,188
[45] Date of Patent: Nov. 12, 1991

[54] AUTOMATIC DOCUMENT CONVEYING DEVICE WHICH OPENS SO JAMS MAY BE CLEARED

[75] Inventors: Tsuyoshi Nagao, Osaka; Yoichiro Irie, Suita; Yoshiyuki Takeda, Osaka; Yasuhiko Kida, Hirakata, all of Japan

[73] Assignee: Mita Industrial Co., Ltd., Osaka, Japan

[21] Appl. No.: 550,853

[22] Filed: Jul. 10, 1990

[30] Foreign Application Priority Data

Jul. 10, 1989 [JP] Japan .................................. 1-175523

[51] Int. Cl.⁵ ............................................. B65H 29/60
[52] U.S. Cl. ........................................ 271/301; 271/3; 271/3.1; 271/274; 271/291
[58] Field of Search ..................... 271/3, 3.1, 274, 291, 271/301

[56] References Cited

U.S. PATENT DOCUMENTS

| | | | |
|---|---|---|---|
| 3,476,382 | 11/1969 | Tregay | 271/301 |
| 3,661,383 | 5/1972 | Morrison | 271/301 |
| 4,045,014 | 8/1977 | Karlsson | 271/274 |
| 4,465,272 | 8/1984 | Kajita et al. | 271/274 |
| 4,469,436 | 9/1984 | Jones et al. | 271/301 |
| 4,714,241 | 12/1987 | Randall | 271/301 |
| 4,717,270 | 1/1988 | Tsutsumi | 271/301 |
| 4,766,467 | 8/1988 | Yamada et al. | 271/3.1 |
| 4,921,236 | 5/1990 | Saeki et al. | 271/301 |
| 4,935,780 | 6/1990 | Yamada et al. | 271/301 |
| 4,954,847 | 9/1990 | Murata et al. | 271/301 |
| 4,974,827 | 12/1990 | Arai et al. | 271/291 |
| 4,993,699 | 2/1991 | Takahashi | 271/291 |

FOREIGN PATENT DOCUMENTS

| | | | |
|---|---|---|---|
| 371688 | 6/1990 | European Pat. Off. | 271/3 |
| 3041971 | 5/1981 | Fed. Rep. of Germany | 271/274 |
| 114960 | 6/1986 | Japan | 271/301 |
| 295358 | 12/1988 | Japan | 271/301 |
| 1-97270 | 8/1989 | Japan | 271/291 |
| 147561 | 6/1990 | Japan | 271/3.1 |
| 2178411 | 2/1987 | United Kingdom | 271/291 |

Primary Examiner—D. Glenn Dayoan
Assistant Examiner—Steven Reiss
Attorney, Agent, or Firm—Antonelli, Terry, Stout & Kraus

[57] ABSTRACT

An automatic document conveying device is provided in an image-processing machine having a transparent plate on which a transparent plate on which to place a document to be processed, the transparent plate having been disposed on the upper surface of a housing. The automatic conveying device is provided with a document delivery re-introduction section which sends a document delivered through a document introduction section and a central main portion selectively to a first document receiving tray, a second document receiving tray and a transparent plate by use of multiple branched sheet passageways. The document delivery re-introduction section is provided with a first branched passage for sending a document into the first document receiving tray, a second branched passage for sending the document into the second document receiving tray, and a re-introduction passage for re-introducing the document into a transparent plate. The document delivery re-introduction section is provided with a first opening-closing member for opening most of a first branched passage and most of a second branched passage, and a second opening-closing member for opening most of a re-introduction passage in a state where the first opening-closing member is held at an open position.

13 Claims, 19 Drawing Sheets

AUTOMATIC DOCUMENT CONVEYING DEVICE WHICH OPENS SO JAMS MAY BE CLEARED

FIELD OF THE INVENTION

This invention relates to an automatic document conveying device to be applied to an image-processing machine having a transparent plate on which to place a document to be copied.

DESCRIPTION OF THE PRIOR ART

An image-processing machine such as an electrostatic copying machine is provided with a parallelpipedal housing, and a transparent plate on which to place a document to be copied is disposed on the upper surface of the housing. In recent years, an automatic document conveying device was proposed and came into commercial acceptance as a device for placing a document on a predetermined position of the transparent plate.

One example of the automatic document conveying device comprises a document table, a document introduction passage extending from the document table to the transparent plate of the image-processing machine, a first document receiving tray, a second document receiving tray, a common passage extending from a transparent plate, a document delivery passage including a first branched passage extending from the downstream end of the common passage to the first document receiving tray and a second branched passage extending from the downstream end of the common passage to the second document receiving tray, and a re-introduction passage branched from the first branched passage and extending to the transparent plate. The document table has disposed therein a document delivery means for delivering a plurality of documents placed on its upper table one by one to a document introduction passage, and a document introduction means for carrying the document delivered to the transparent plate is disposed in the document introduction passage. Further, between the document introduction passage and the document delivery passage, a document conveying means is disposed for conveying the document along the transparent plate. In the document delivery passage, is disposed a document delivery means for feeding the document delivered to the document introduction passage to the first document receiving tray, the second document receiving tray or the transparent plate. At the downstream end of the common passage in the document delivery passage is disposed a branched passage switching means to be selectively held at the first branching position and a second branching position. In the first branching passage is disposed a discharging-introduction switching means to be selectively held at a discharging position and a re-introduction position. The branched passage switching means, when it is at the first branching position, brings the common passage of the document discharging passage into communication with the first branched passage, and when it is at the second branching position, brings the common passage of the document discharging passage into communication with the second branched passage. The discharging-re-introduction switching means, when it is at the discharging position, shuts off the re-introduction passage, and when it is at the re-introduction position, shuts off the first branching passage. Hence, when the branched passage switching means is at the first branched position and the discharging-re-introduction switching means is at the discharge position, the document delivered to the common passage of the document discharge passage is discharged to the first document receiving tray via the first branched passage. When the branched passage switching means is held at the first branching position and the discharging-re-introduction switching means is at the re-introduction position, the document delivered to the common passage passes through part of the first branched passage and is positioned at the transparent plate of the image processing machine. When the branched passage switching means is at the second branching position, the document discharged into the common passage passes the second branched passage and is discharged onto the second document receiving tray.

However, the automatic document conveying device described above has the following problems to be solved.

Firstly, since the construction of the document delivery passage and its vicinity is relatively complex, when jamming of a document occurs in the first or second branched passage, or in the re-introduction passage, the document cannot be easily removed.

Secondly, the document discharged onto the document receiving tray from the document delivery passage is not stocked as required in the stacked state, although this problem is not limited to an automatic document conveying device of the above-mentioned type.

Thirdly, when a document jams up in the document delivery passage and the roller pair in the document delivering means are maintained in the nipped state, the document is likely to be damaged when the document is to be removed. This problem, however, is not limited to an automatic document conveying device of the above-mentioned type.

SUMMARY OF THE INVENTION

A first object of this invention is to provide an excellent automatic document conveying device in which the first and second branched passages and the re-introduction passage in the document delivery passage can be opened, and therefore if document jamming occurs in these sites, the jamming document can be easily removed without damaging.

A second object of this invention is to provide an excellent automatic document conveying device in which documents from the document discharge passage are discharged and stocked as required in the stacked state on a document receiving tray.

A third object of this invention is to provide an excellent automatic document conveying device in which the nipped state of a specific roller pair in the document delivery means can be easily released, whereby when a document jams up in the vicinity of the specific roller pair, the document can be easily removed without breakage.

According to a first aspect of this invention, at least a greater portion of a first branched passage of the document delivery passage and at least a greater portion of a second branched passage are defined by a first opening-closing member, and at least the other side of the first branched passage of the document delivery passage, and one side of at least a greater portion of a re-introduction passage are defined by a second opening-closing member. Hence, when the first opening-closing member is held at an open position, at least a greater portion of the first and second branched passages are opened, and when the first opening-closing member is held at an open position, and the second opening-closing member is held at the open position, at least a greater portion of the re-introduction passage is opened. Thus, by bringing the first and second opening-closing members to the open positions, a document which jams up in the first branched passage, the second branched passage or the common passage can be easily removed.

According to a second aspect, a document discharging roller located at the downstream end of a document discharge passage in the document discharging means is drivingly connected to a driving means so that its peripheral speed is slower than the other rollers of the document discharging means, and between the document discharging rollers and a driving means, a one-way clutch means is interposed. In this automatic document conveying device, the document to be discharged into the document receiving tray is conveyed at a relatively high speed till the downstream end of the document discharging passage, and when the document is to be discharged onto the document receiving tray only by the action of the document conveying roller alone, it is conveyed at a relatively low speed. Hence, when the document is discharged completely onto the document receiving tray, it is moved at a relatively low speed. Thus, the document discharged from the document delivery passage is placed in the stacked state on the document receiving tray, and is stocked as required on the documents placed on the document receiving tray. Further, the action of the one-way clutch means permits a document discharging roller to rotate at a relatively high speed. Thus, the excessive bending of a document at the time of discharging the document does not occur, and therefore, the damage of the document can be prevented.

According to a third aspect, the automatic document conveying device is constructed such that a document from a document delivery passage can be discharged downward toward a document receiving tray. In this automatic document conveying device, the forward end portion of the document discharged from the document discharge passage makes contact with the upper surface of the document discharged onto the document receiving tray and moves in the discharge direction while being in contact with the discharged document. Hence, the discharging speed of the forward portion of the document discharged from the document delivery passage decreases, and the document is stocked in the stacked state as required on the document existing on the document receiving tray.

Furthermore, according to a fourth aspect, the document delivery means has a main roller to be rotatably driven in a predetermined direction and an auxiliary roller co-acting with the main roller. Provided also are a biasing spring for bringing an auxiliary roller into press-contact with the main roller and a press-contact releasing means for moving the auxiliary roller in a direction to isolate it from the main roller against the action of the biasing spring. When an opening-closing member defining part of the document delivery passage is maintained in the closed state, the action of the biasing spring maintains the auxiliary roller in press-contact with the main roller, and when the opening-closing member is maintained in the open state, the action of the press-contact releasing means maintains the auxiliary roller in the inactive state in which it does not substantially act on the main roller. Accordingly, by opening the opening-closing member, the press contacting state of the main roller and the auxiliary roller is released, and in the event that document jamming should occur in the main roller and the auxiliary roller or in their vicinity, the document can be easily removed without damaging the jamming document.

BRIEF DESCRIPTION OF THE ACCOMPANYING DOCUMENT

Figure 16:
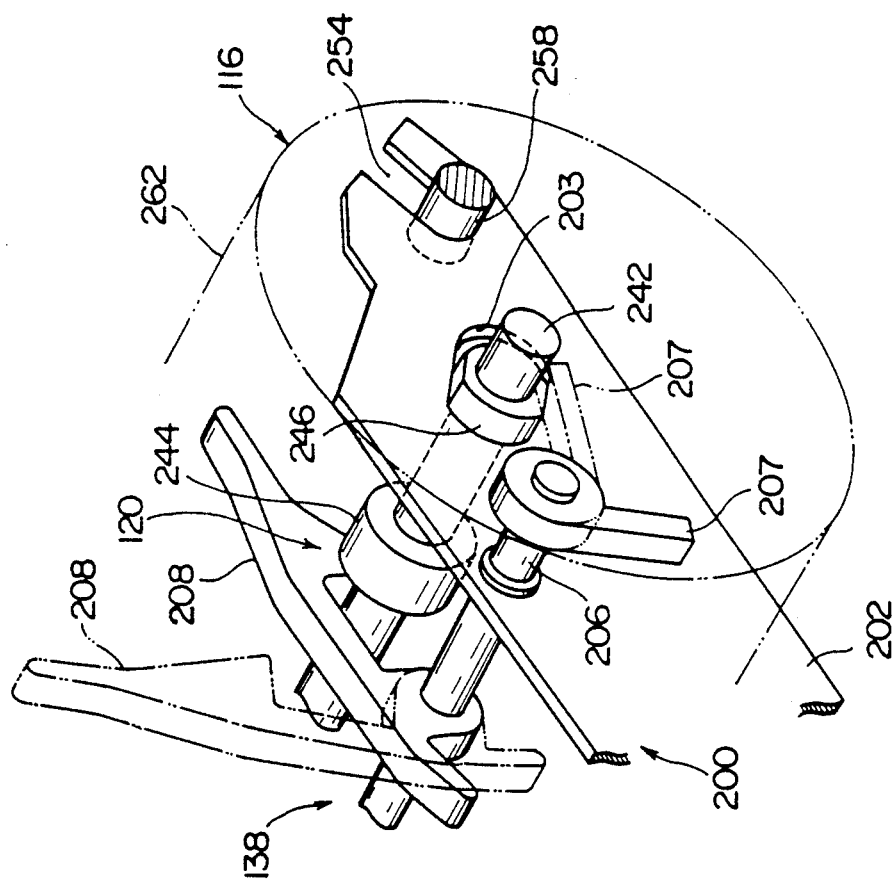
Figure 17:
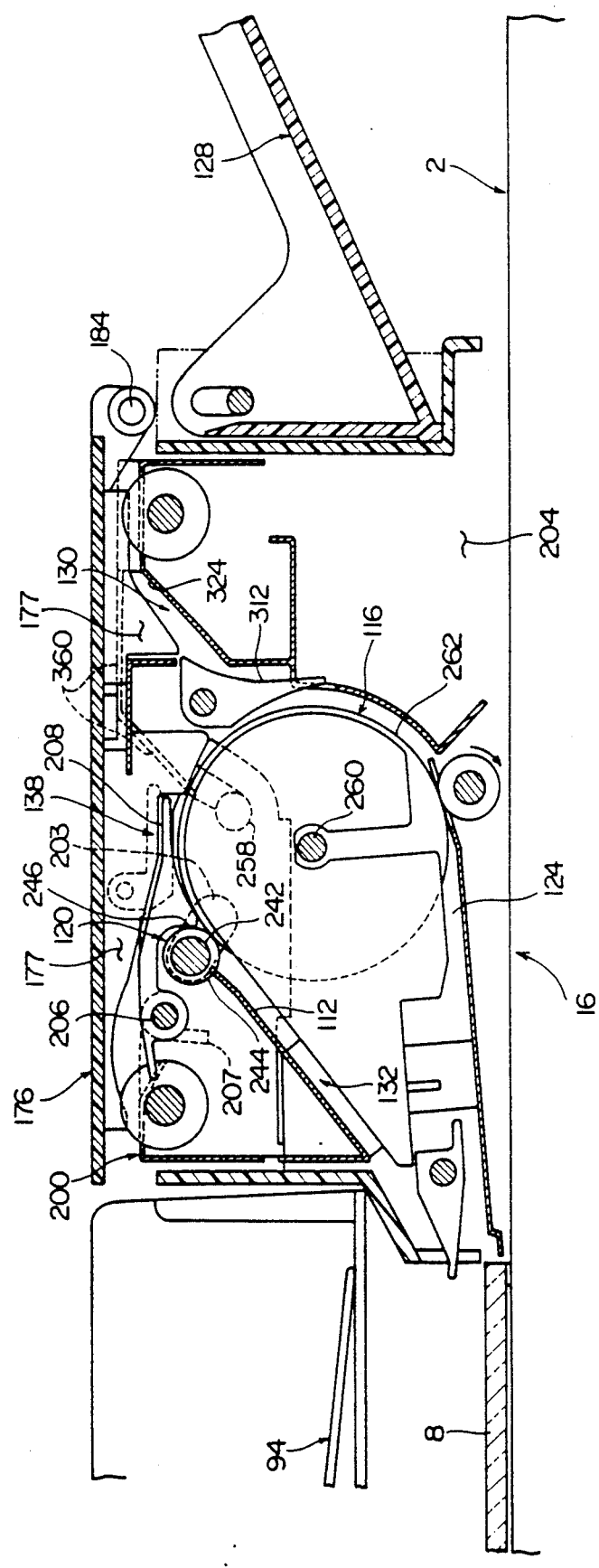
Figure 18:
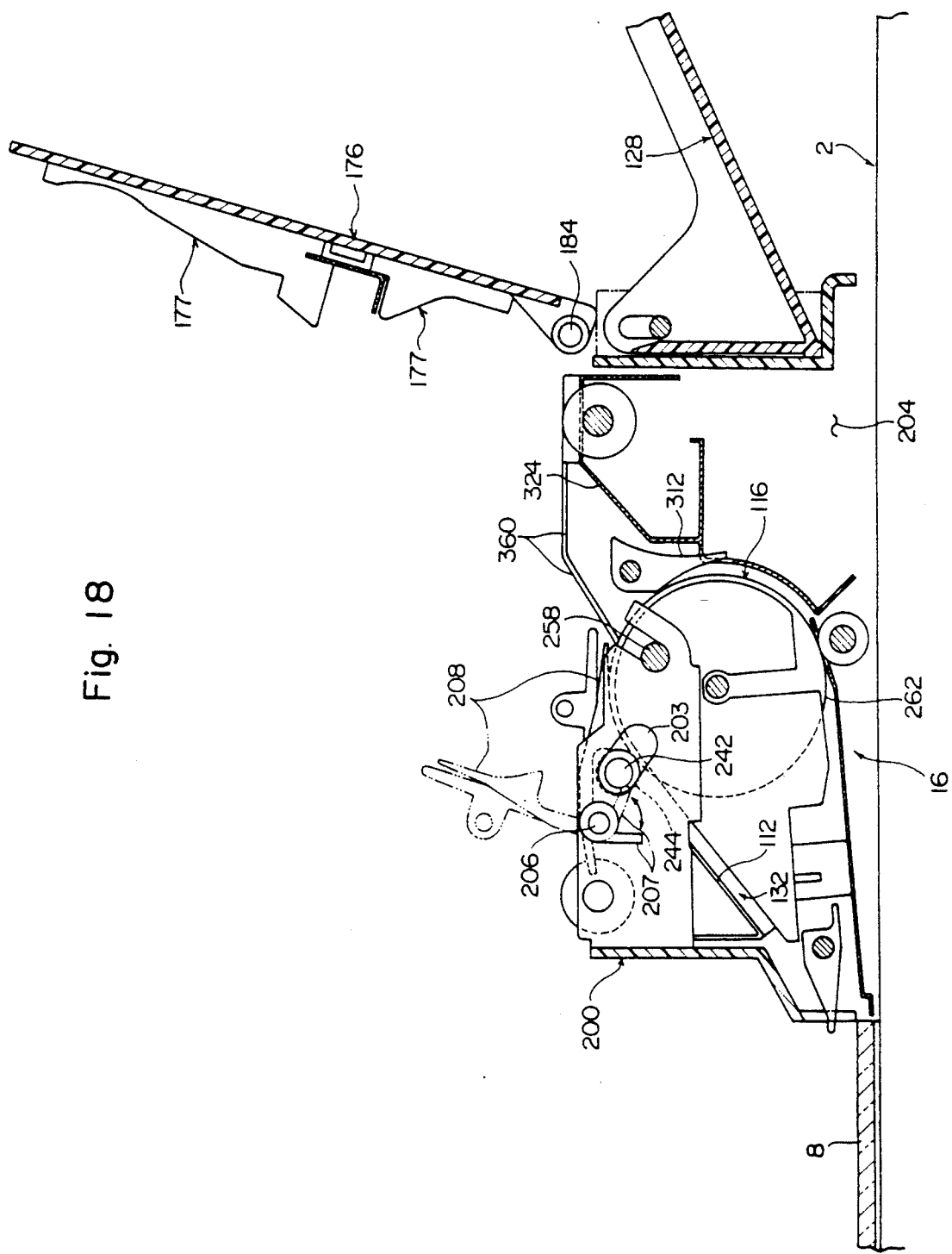
Figure 19:
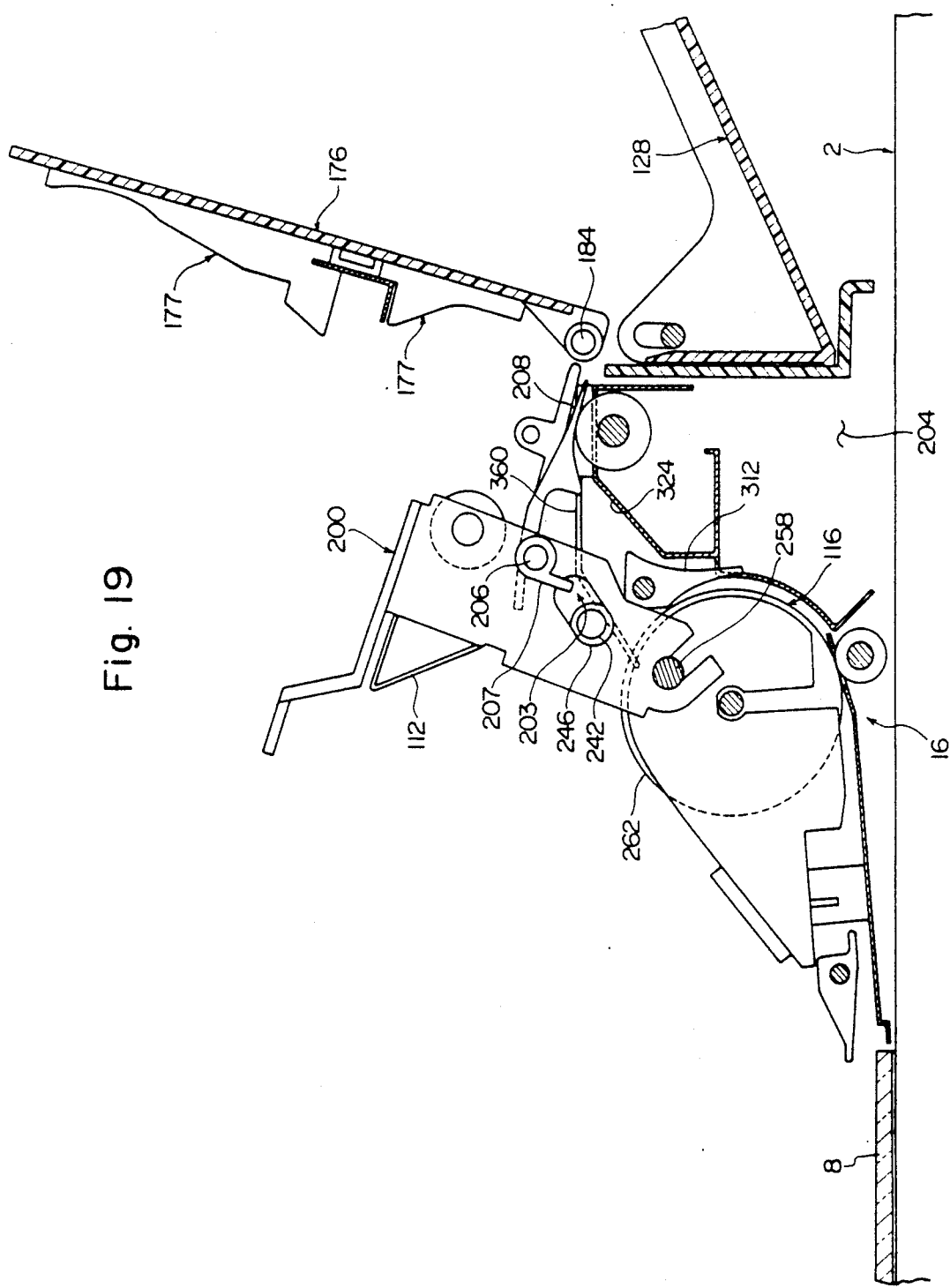

FIGS. 16 to 19 are views for explaining other embodiments of a pivot unit as a second opening-closing member. FIG. 16 is a perspective view showing a part of the pivot unit. FIGS. 17 and 19 are sectional views of a document delivering and re-introduction section including a pivot unit, each for illustrating the opening operation of the document delivery passage.

DETAILED DESCRIPTION OF THE PREFERRED EMBODIMENTS

Preferred embodiments of the automatic document conveying device constructed in accordance with this invention which is provided in an electrostatic copying machine as one example of the image processing machine will be described in detail with reference to the accompanying drawings.

Outline of the structure of the machine as a whole

Figure 1:
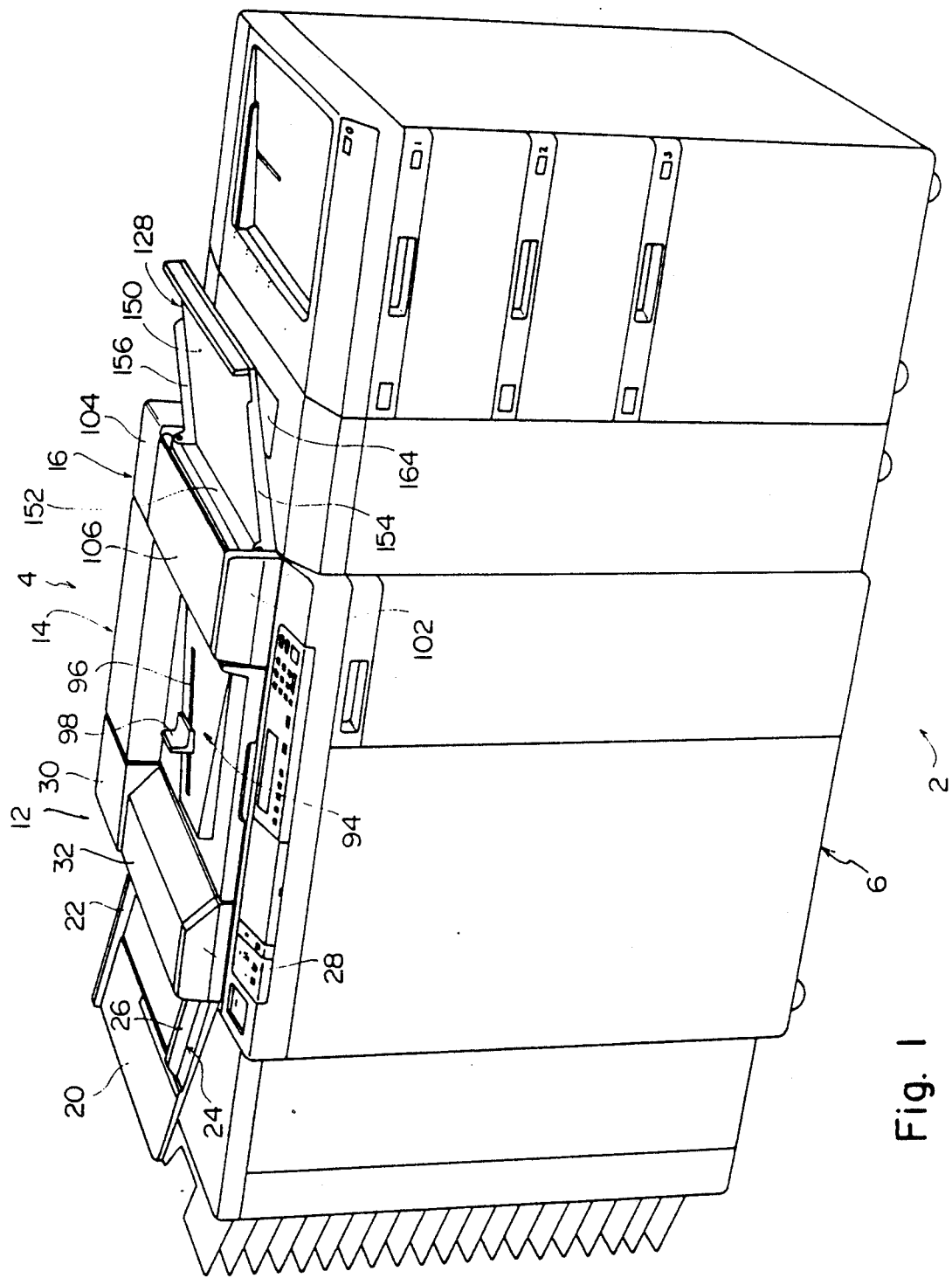
FIG. 1 is a perspective view showing an electrostatic copying machine to which one specific embodiment of an automatic document conveying device in accordance with this invention is fixed.
Figure 2:
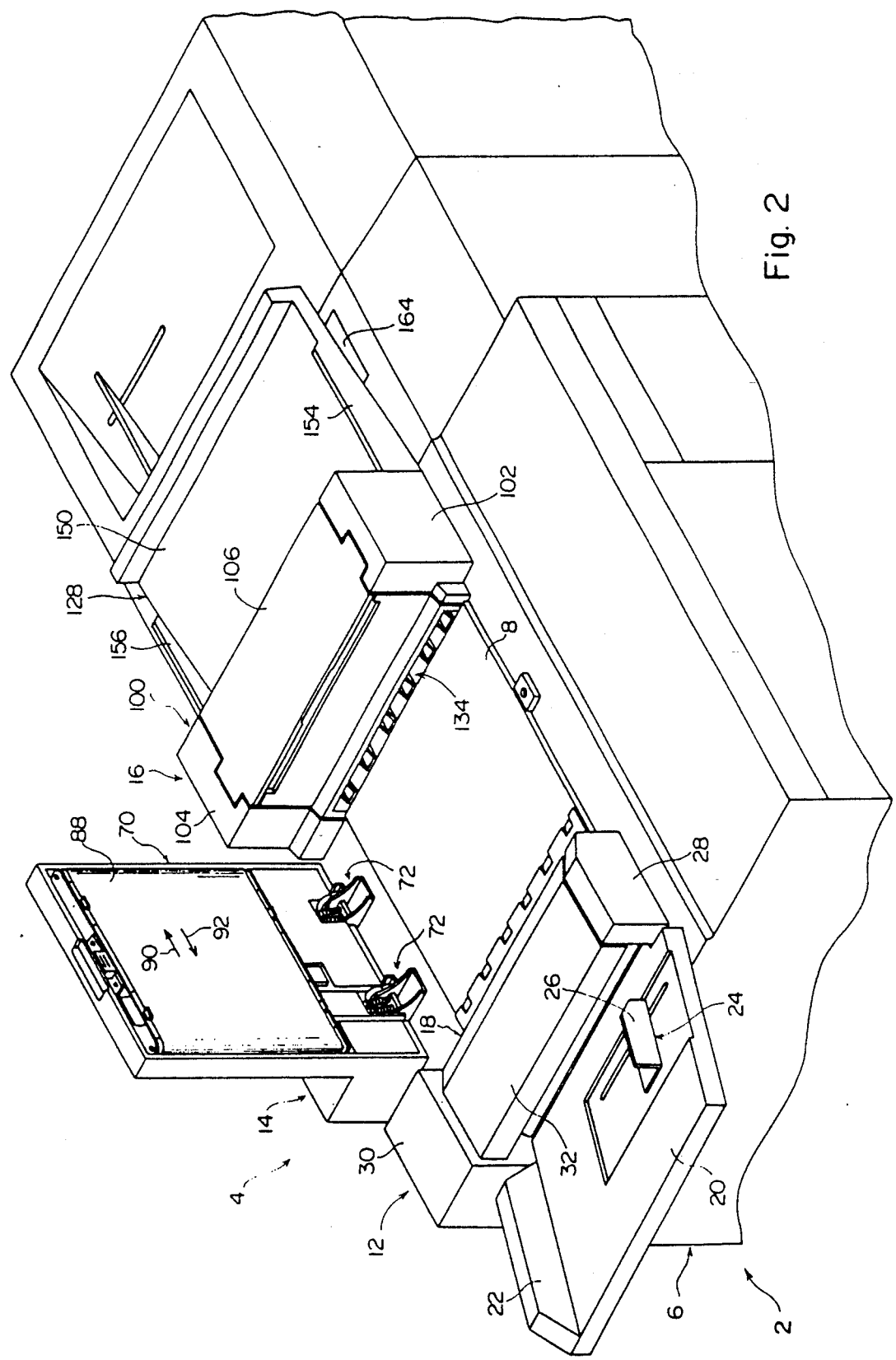
FIG. 2 is a partial perspective view showing an opening-closing frame member in the automatic document conveying device in the electrostatic copying machine of FIG. 1 as the opening-closing frame member is in the open state.
Figure 3:
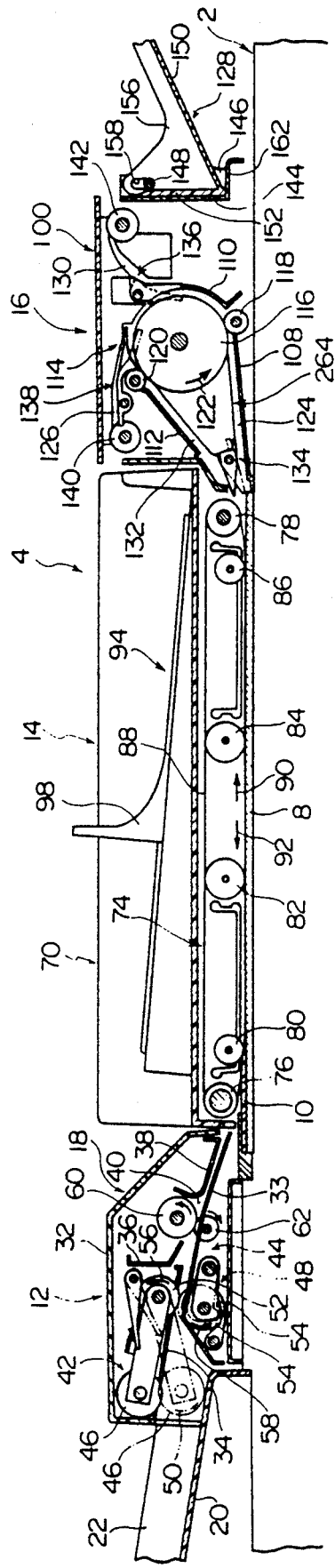
FIG. 3 is a simplified sectional view showing the automatic document conveying device of FIG. 1.

FIGS. 1, 2 and 3 show an electrostatic copying machine 2 and an automatic conveying device, shown generally at 4, provided in the electrostatic copying machine 2. The electrostatic copying machine 2 which may be of a known type includes a parallelepipedal housing 6. A transparent rectangular glass plate 8 (FIGS. 2 and 3) is disposed in the central portion of the upper surface of the housing 6. A document placing position regulating member 10 is disposed on one end edge (the left end edge in FIG. 3) of the transparent plate 8. The document placing position regulating member 10 extends in a perpendicular direction in FIG. 3 along the one end edge of the transparent plate 8. Although not shown, various constituent elements including a rotating drum having an electrostatic photosensitive layer on its surface are disposed in the housing 6 of the electrostatic copying machine 2. As is well known, a document to be copied is usually placed on the transparent plate 8 with its surface to be copied directed downwardly and its one end edge abutting against the inside edge (the right end edge in FIG. 3) of the document placing position regulating member 10. The under surface of the document placed on the transparent 8 is optically scanned and projected onto the rotating drum, whereby a latent electrostatic image is formed on the rotating drum. The electrostatic latent image is developed to a toner image, and the developed toner image is transferred onto a copying paper which may be an ordinary paper. The transferred toner image is fixed to the copying paper, and thus, a copy is produced.

The automatic document conveying device 4 constructed in accordance with this invention is comprised of a document introduction section 12, a central main portion 14 and a document delivering and introduction section 16.

The document introduction section 12 is disposed adjacent to the one end edge of the transparent plate 8 on the downstream side (the left side in FIG. 3). The document introduction section 12 includes a frame member 18 mounted on the upper surface of the housing 6 of the electrostatic copying machine 2 and a document table 20 extending toward the upstream side. As clearly shown in FIG. 3, the document table 20 extends slightly upwardly inclined toward the upstream side (the left side in FIG. 3). An upstanding stationary document regulating wall 22 is disposed in the rear edge of the document table 20. Furthermore, in the document table 20, a movable document regulating member 24 (FIGS. 1 and 2) which may be of a known type is mounted so that it is movable to and fro. The movable document regulating member 24 has an upstanding wall 26. A document placed on the document table 20 is positioned between the stationary document regulating wall 22 and the upstanding wall 26 of the movable document regulating member 24. The frame member 18 includes a front supporting member 28, a rear supporting member 30 and a cover member 32 disposed between the supporting members 28 and 30. As shown clearly in FIG. 3, between the front supporting member 28 and the rear supporting member 30 and within a space below the covering member 32, one lower regulating plate 33 and three upper regulating plates 34, 36 and 38 are disposed, and between the lower regulating plate 33 and the upper regulating plates 34, 36 and 38, a document introduction passage 40 is defined. Again with reference to FIG. 3, a document delivering means 42 for delivering a plurality of documents placed on the document table 20 one by one into the document introduction passage 40, and a document introduction means 44 for delivering the documents delivered to the document introduction passage 40 onto the transparent plate 8 are also disposed between the front supporting member 28 and the rear supporting member 30. The document delivery means 42 includes a document delivery roller 46 and a document separation roller pair 48. The document delivery roller 46 is selectively lowered from a nonacting position shown by a solid line as shown by a two-dot chain line, and is caused to abut against the upper surface of the upperstream end portion of the uppermost document among a plurality of documents placed on the document table 20, and rotated in the direction shown by an arrow 50. Thus, the document placed on the document table 20 is delivered toward the document introduction passage 40. The document separation roller pair 48 is comprised of a feed roller 52 and a reversal roller 54. The reversal roller 54 is selectively held at a non-acting position shown by a solid line and an acting position shown by a two-dot chain line. When held at the non-acting position, the reversal roller 54 is isolated downwardly from the feed roller 52. When held at the acting position, the reversal roller 54 abuts with the feed roller 52 and cooperatively acts with it. The feed roller 52 is rotated in the direction shown by an arrow 56, and the reversal roller 54 is rotated in the direction shown by an arrow 58. Such a document separation roller pair 48, if a plurality of documents are delivered simultaneously from the document table 20 by the document delivering roller 46, separates only the uppermost document from the other documents and carries the document into the document introduction passage 40 while it hampers the introduction of the other documents. The document introduction means 44 is comprised of an upper roller 60 and a lower roller 62 which act cooperatively. The upper roller 60 and the lower roller 62 are rotated in the direction shown by an arrow to introduce the document carried into the document introduction passage 40 onto the transparent plate 8.

The structures of the document delivering means 42 (document delivery roller 46 and the document separation roller pair 48) and the document introduction means 44 (the upper roller 60 and the lower roller 62) do not constitute the novel features of the invention, and may be, for example, of the form shown in the specification and drawings of Japanese Laid-Open Patent Publication No. 100939/1990. Accordingly, in the present specification, a detailed description of these structures will be omitted.

The central main portion 14 in the automatic document conveying device 4 is provided with an opening-closing frame member 70. The opening-closing frame member 70 is mounted on the upper surface of the housing 6 of the electrostatic copying machine 3 via a pair of mounting mechanism 72 disposed at the rear of the transparent plate 8, and can be opened or closed by hand between a closed position shown in FIGS. 1 and 3 and an opened position shown in FIG. 2. When the opening-closing frame member 70 is held at the closed position, the transparent plate 8 is covered by the opening-closing frame member 70, and when the opening-closing frame member 70 is held at the opened position, the transparent plate 8 is exposed to view.

The main portion of the opening-closing frame member 70, which covers the transparent plate 8 at the closed position is of a box-like shape with its open under-surface. As clearly shown in Table 3, a document conveying means 74 for conveying a document onto the transparent plate 8 is disposed in the box-like main portion of the opening-closing frame member 70. The document conveying means 74 is constructed of a conveyor belt mechanism comprised of driven roller 78, driven follower rollers 76, guiding rollers 80, 82, 84 and 86 and an endless belt 88 wrapped about these rollers which are arranged at intervals in the document conveying direction (in the left-right direction in FIG. 3). The document conveying means 74 is driven selectively in a normally rotating conveying direction shown by an arrow 90 and a reverse conveying direction shown by an arrow 92 by a rotating driving source which may be a reversible direct-current electric motor. The upper surface of the box-like main portion of the opening-closing frame member 70 constitutes a first document receiving tray 94 for receiving documents to be discharged through the document delivering and re-introducing section 16. The first document receiving tray has provided therein a document front edge regulating member 98 which is movable along a slit 96 and extends frontwardly inclinedly toward the upstream side (FIG. 1). The front edge of a document to be discharged onto the first document receiving tray 94 abuts with the upstanding wall of the document front edge regulating member 98 and is stopped at a required position on the first document receiving tray 94.

The structure of the central main portion 14 in the automatic document conveying device 4 does not constitute the novel feature of the invention, and therefore, a detailed description of the construction of the central main portion 14 will be omitted in the present specification.

The document delivering and re-introducing section 16 in the automatic document conveying device 4 is disposed adjacent to the other end edge of the transparent plate 8 on the downstream side (the right side in FIG. 3). The document delivering and re-introducing section 16 is provided with a frame member 100 mounted on the upper surface of the housing 6 of the electrostatic copying machine 2, and the frame member 100 includes a front supporting member 102, a rear supporting member 104, and an intermediate supporting member 106 interposed between the supporting members 102 and 104. As shown in FIG. 3, three regulating plates 108, 110 and 112 are disposed between the front supporting member 102 and the rear supporting member 104 and in the inside space of the central supporting member 106. A document delivering means 114 is also disposed between the front supporting member 102 and the rear supporting member 104. The document delivering means 114 includes a delivery main roller 116 disposed in a space defined in the regulating plates 108, 110 and 112, and a delivery auxiliary roller 118 and a re-introduction auxiliary roller 120 which cooperates with the delivery main roller 116. A document delivery passage is defined around the delivery main roller 116 rotating in the direction shown by an arrow 122. The document delivery passage has a common passage 124 extending from the other end edge of the transparent plate 8 to the peripheral surface of the delivery main roller 116, the first branched passage 126 extending along the peripheral surface of the delivery main roller 116 from the downstream end of the common passage 124 toward the left in FIG. 3 to the first document receiving tray 94, and the second branched passage 130 extending from the lower end of the common passage 124 toward the right in FIG. 3 to the second document receiving tray 128 (to be described). Furthermore, a re-introduction passage 132 for conducting the document branched from the first branched passage 126 again onto the transparent plate 8 extends up to the other end portion of the transparent plate 8. In the vicinity of the other end portion of the transparent plate 8, is disposed a delivery re-introduction switching means 134 to be selectively held at a delivery position shown by a solid line and at a re-introduction position shown by a two-dot chain line in FIG. 3. The delivery re-introduction switching means 134 is held at the delivery position when a document on the transparent plate 8 is to be delivered to the document delivery passage, and is held at the re-introduction position when the document is again held on the transparent plate 8 through the re-introduction passage 132 from the first branched passage 126. At the downstream end of the common passage 124 of the document delivery passage, a branched passage switching means 136 is disposed which is to be selectively held at a first branched position shown by a solid line and a second branched position shown by a two-dot chain line in FIG. 3. The branched passage switching means 136 is held at the first branched position when it is to conduct the document introduced into the common passage 124 to the first branched passage 126, and is held at the second branched position when it is to conduct the document introduced into the common passage 124 to the second branched passage 130. At a predetermined site of the first branched passage 126, a discharge re-introduction switching means 138 is disposed which is selectively held at a re-introduction position shown by a solid line and a discharge position shown by a two-dot chain line in FIG. 3. The discharge re-introduction switching means 138 is held at the discharge position when the document introduced into the first branched passage 126 is to be discharged to the first document receiving tray 94, and is held at the re-introduction position when the document introduced into the first branched passage 126 is positioned again on the transparent plate 8 through the re-introduction passage 132. In the downstream ends of the first branched passage 126 and the second branched passage 130 of the document delivery passage, there are provided a first document discharge roller 140 and a second document discharge roller 142 for discharging the document to the first document receiving tray and the second document receiving tray 128.

Figure 11:
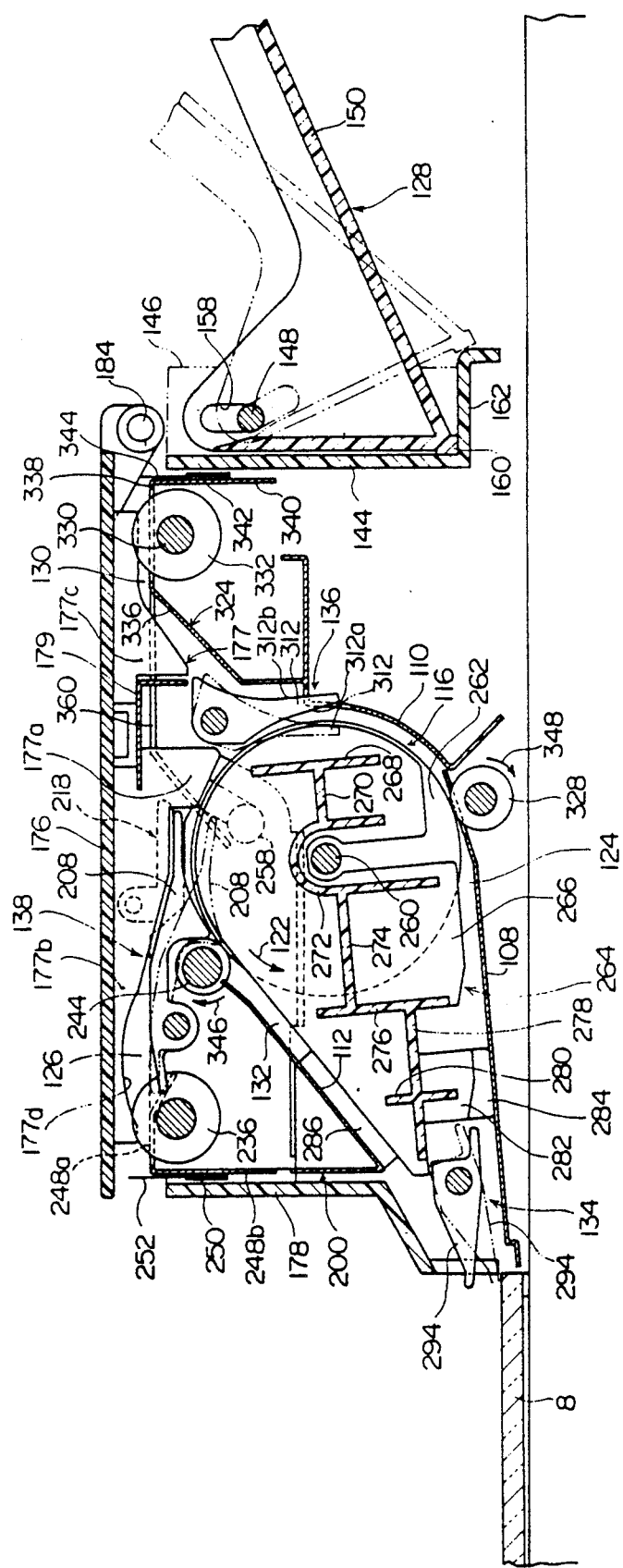
FIGS. 11 to 14 are partial sectional views for explaining the opening operation of a document delivery passage.

The second document receiving tray 128 is disposed on the right side of the document delivery and re-introduction section 16. In the specific embodiment, on both end portions of the right end wall 144 of the intermediate supporting member 106 in the document delivery and re-introduction section 16, bent portions 146 projecting to the right in FIG. 3 were provided, and inwardly projecting supporting pins 148 are implanted in the bent portions 146 (only one of which is shown in FIGS. 3 and 11). The second document receiving tray 128 is provided with a substantially flat bottom wall 150, and an end wall 152 is provided in the base end of the bottom wall 150. On both side edges of the bottom wall 150, side walls 154 and 156 (FIGS. 1 and 2) are provided. One end portion of each of the side walls 154 and 156 projects upwardly toward the upper edge of the end wall 152, and a long slit 158 is formed in the projecting portion. The second document receiving tray 128 is mounted pivotably up-and downwardly on the document delivering and re-introduction portion 16 by positioning a pair of supporting pins 148 within the long slit 158 of the side walls 154 and 156. The second document receiving tray 128 is selectively held at a receiving position shown by a solid line (the position shown in FIGS. 1 to 3) and an escape position shown by a two-dot chain line) as shown in FIG. 11. At the receiving position, an abutting projecting portion 160 provided at one end of the bottom wall 150 of the second document receiving tray 128 is positioned in a corner portion defined in the lower end portion of the right end wall 144 in the document delivering and re-introduction section 16, namely, a corner portion formed between the lower end portion of the right end wall 144 and a lower bent portion 162 defined by bending the lower end portion of the right end wall 144 toward the second document receiving tray 128. Hence, by abutting the abutting protruding portion 160 against the corner portion, the pivoting movement of the second document receiving tray 128 beyond the receiving position is hampered (at this receiving position, the supporting pin 148 is positioned at the lower end portion of the long slit 158 formed in the side walls 154 and 156). Where the second document receiving tray 128 is maintained at the receiving position, its bottom wall 150 inclines relatively gently in an upwardly right direction in FIGS. 3 and 11, and its other end portion, as shown in FIGS. 1 and 2, is positioned up to above the opening-closing cover 164 provided on the upper surface of the housing 6 of the electrostatic copying machine 2. Below the opening-closing cover 164 is disposed a toner accommodating container (not shown) for supplying a toner to the developing chamber of the developing device (not shown). By opening the opening-closing cover 164, a fresh toner may be supplied. Accordingly when the second document receiving tray 128 is held at the receiving position, since the bottom wall 150 inclines relatively gently, the document discharged through the second branched passage 130 is discharged as required in position onto the document receiving tray 128 and stocked in a stacked state. However, since the bottom wall 150 covers the opening-closing cover 164, the opening-closing cover 164 is difficult to open. In contrast, at the above escape position, the abutting protruding portion 160 of the second document receiving tray 128 gets out of the corner portion and is positioned at the right side of the free end of the lower bent portion 162 in the right end wall. Accordingly, when the abutting projecting portion 160 abuts against the free end of the lower bent portion, the pivoting movement of the second document receiving tray 128 beyond the escape position is hampered (at this escape position, the second document receiving tray 128 is supported by a pair of supporting pins 148, and the supporting pins 148 rest at the upper end of the long slit 158). When the second document receiving tray 128 is held at the escape position, it is seen as shown by a two-dot chain line in FIG. 11 that its bottom wall 150 extends at a relatively large inclination in a right upward direction in FIGS. 3 and 11 and its other end portion does not substantially cover the opening-closing cover 164. Hence, the opening-closing cover 164 can be easily opened or closed by positioning the second document receiving tray 128 at the escape position. By opening the opening-closing cover 164, a fresh toner can be supplied to the toner accommodating container through an opening formed. When the document is desired to be discharged while the second document receiving tray 128 is held at the escape position, the following problem arises. Specifically, when the document has relatively high stiffness, it curves greatly, and the document itself is likely to be bent.

Document delivering and re-introduction section

Now, with reference to FIGS. 4 to 11 together with FIG. 3, the document delivering and re-introduction section 16 will be described in detail.

Figure 4:
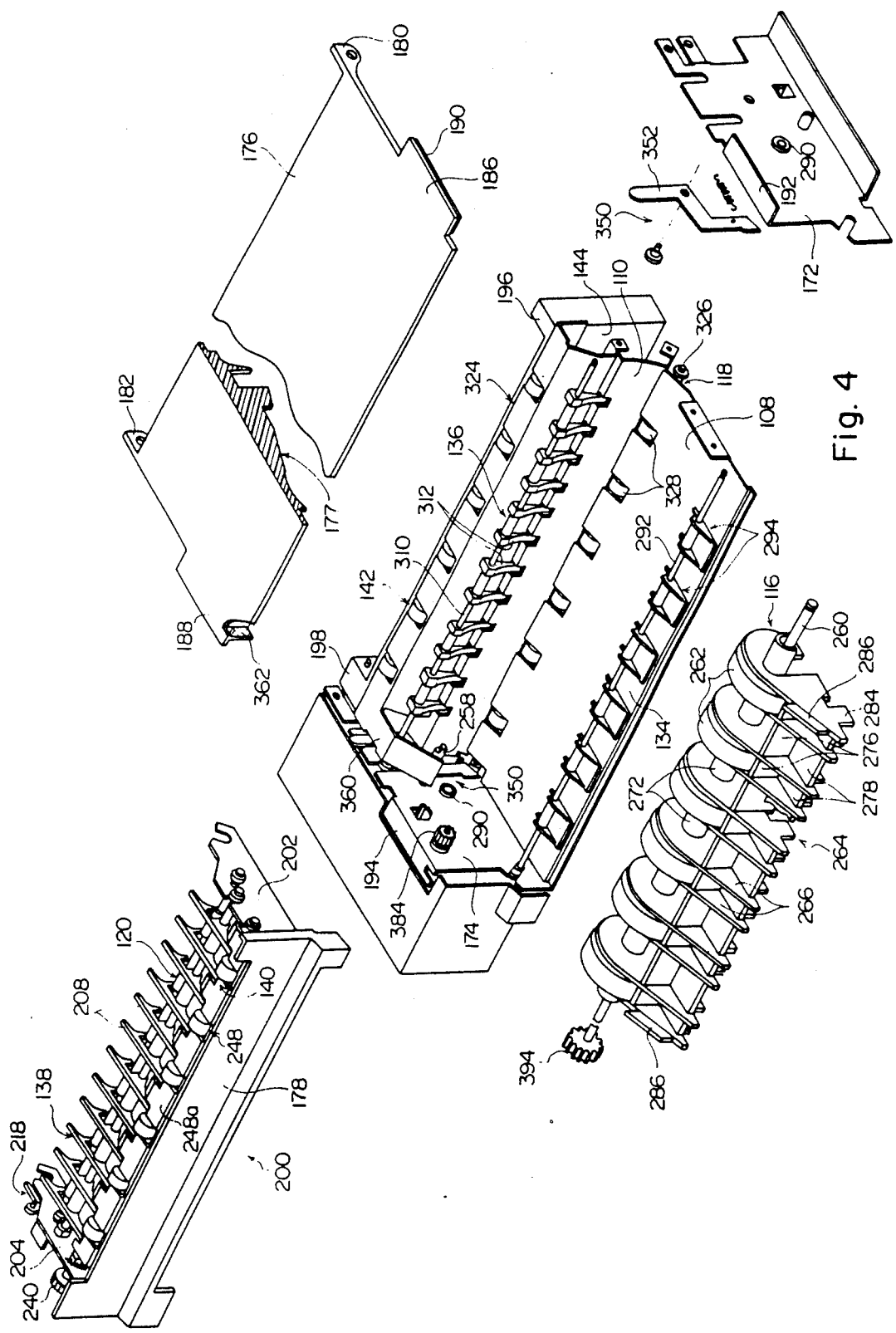
FIG. 4 is a perspective view which shows a document delivery means and a re-introduction section in the automatic document conveying device of FIG. 1 as they are exploded.
Figure 5:
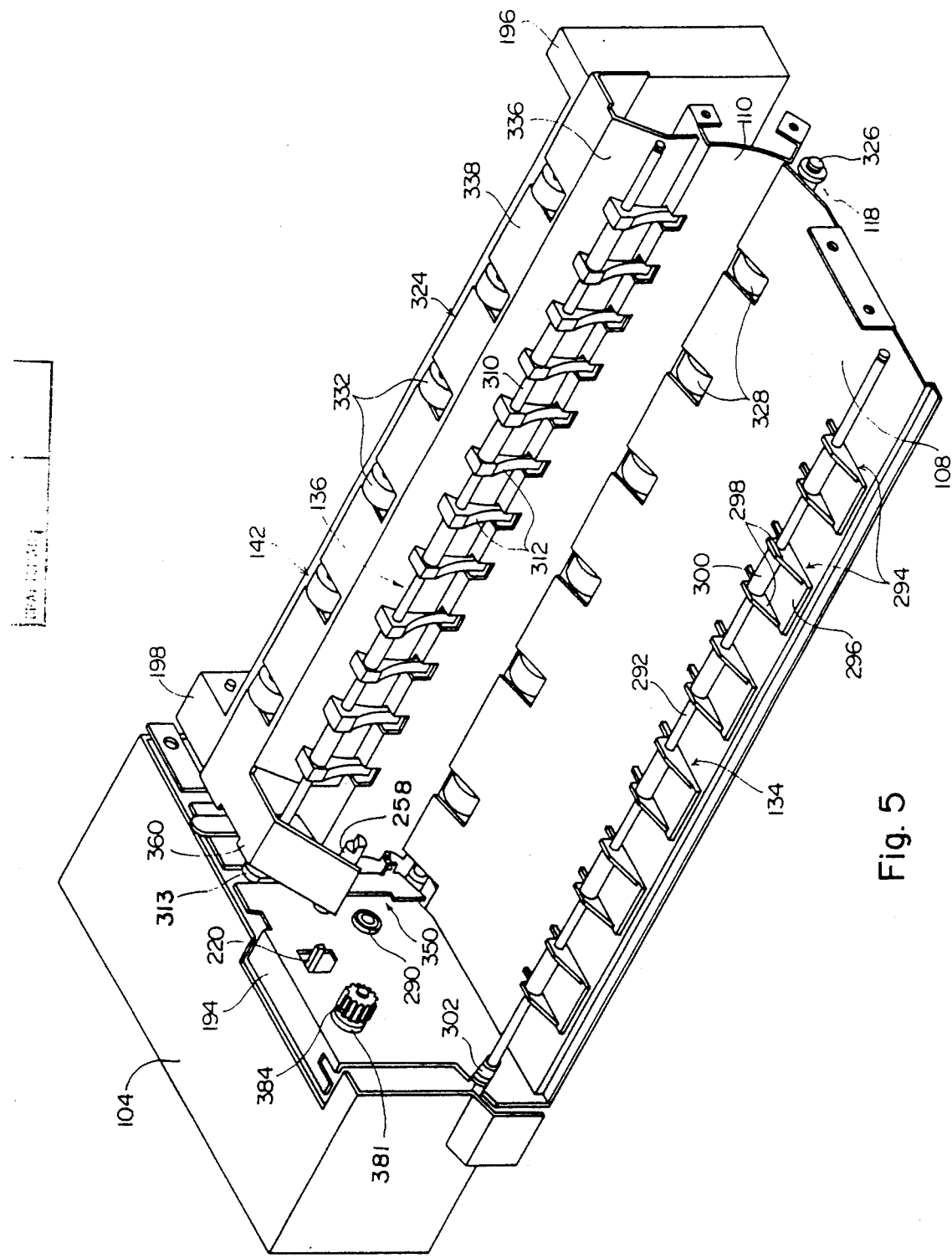
FIG. 5 is a perspective view showing the essential parts of the document delivering and re-introduction section of FIG. 4.
Figure 6:
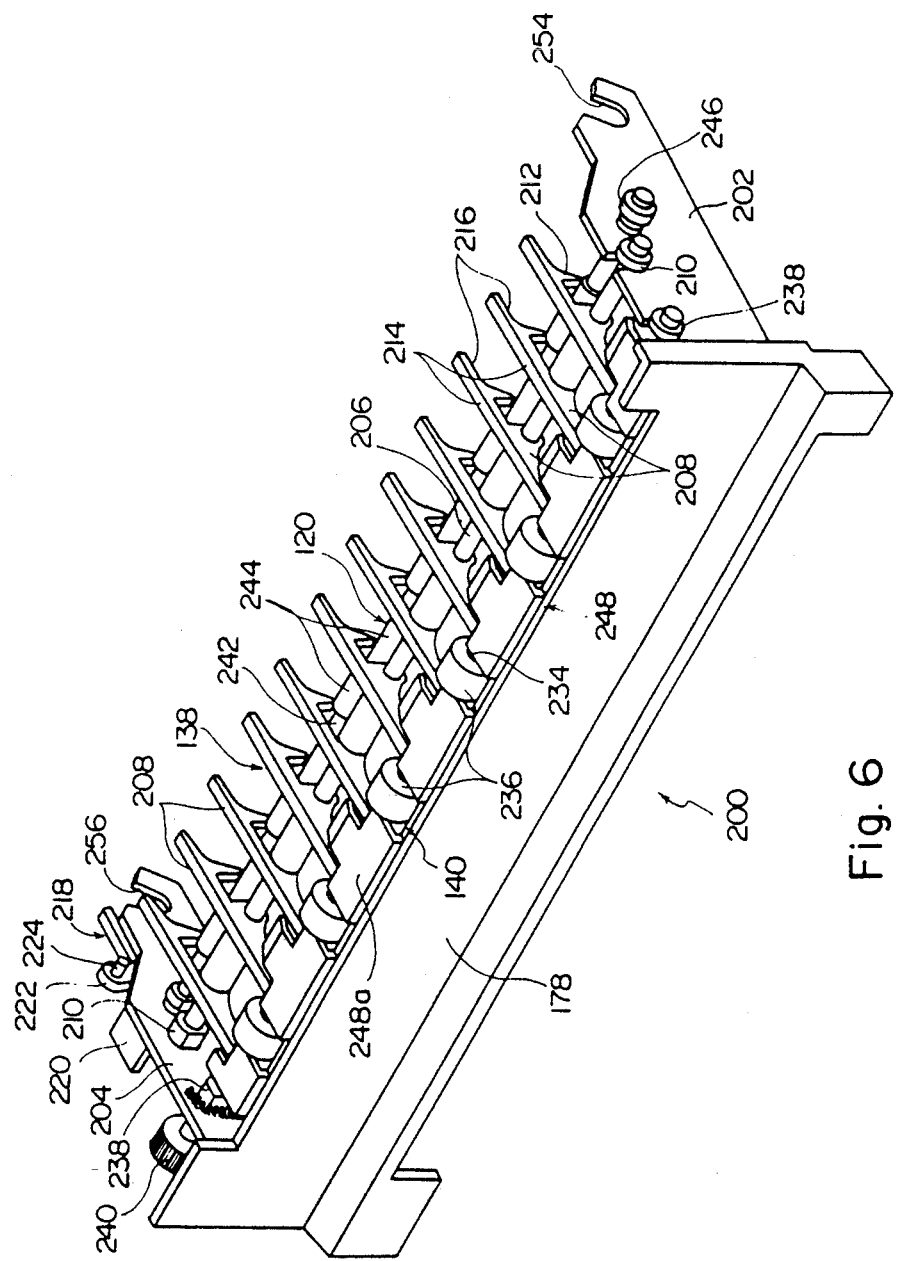
FIG. 6 is a perspective view showing a pivoting unit in the document delivering and re-introduction section shown in FIG. 4.
Figure 7:
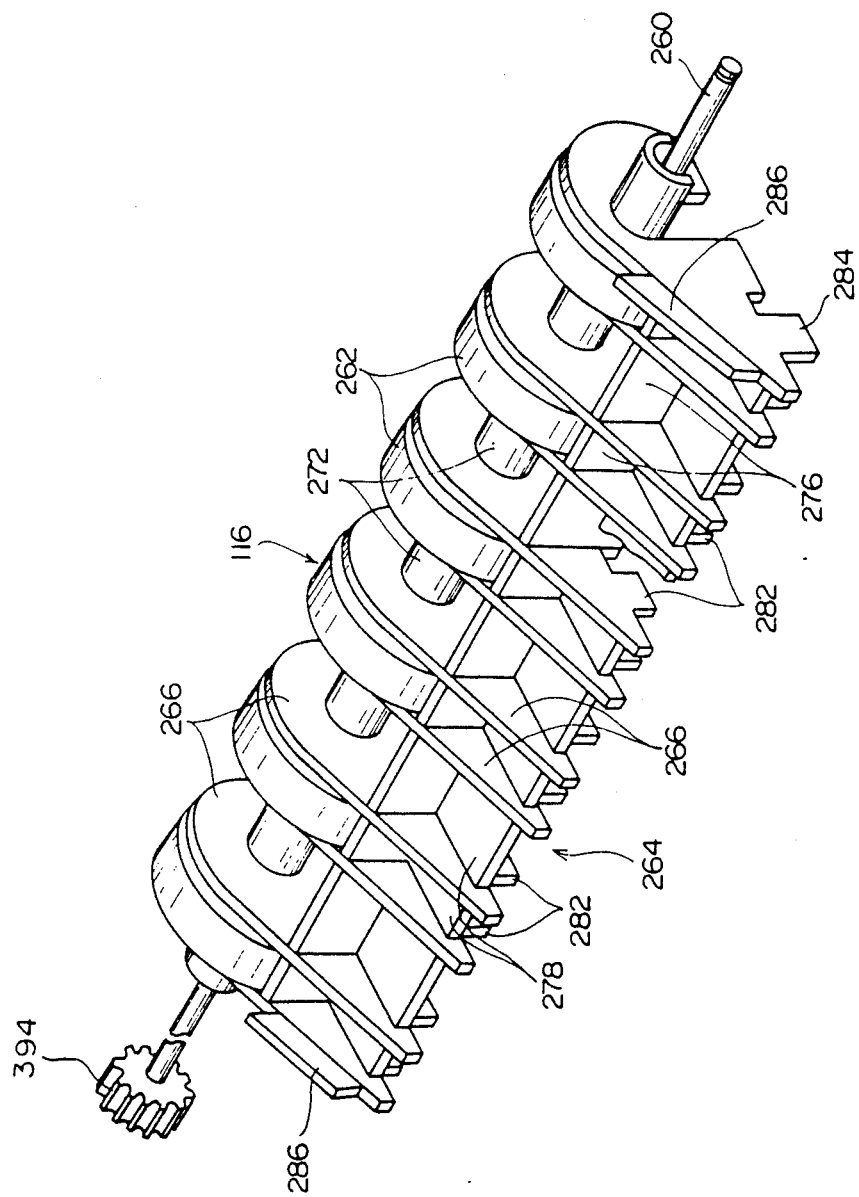
FIG. 7 is a perspective view showing a delivery main roller and a movable member in the document delivering and re-introduction section shown in FIG. 4.
Figure 8:
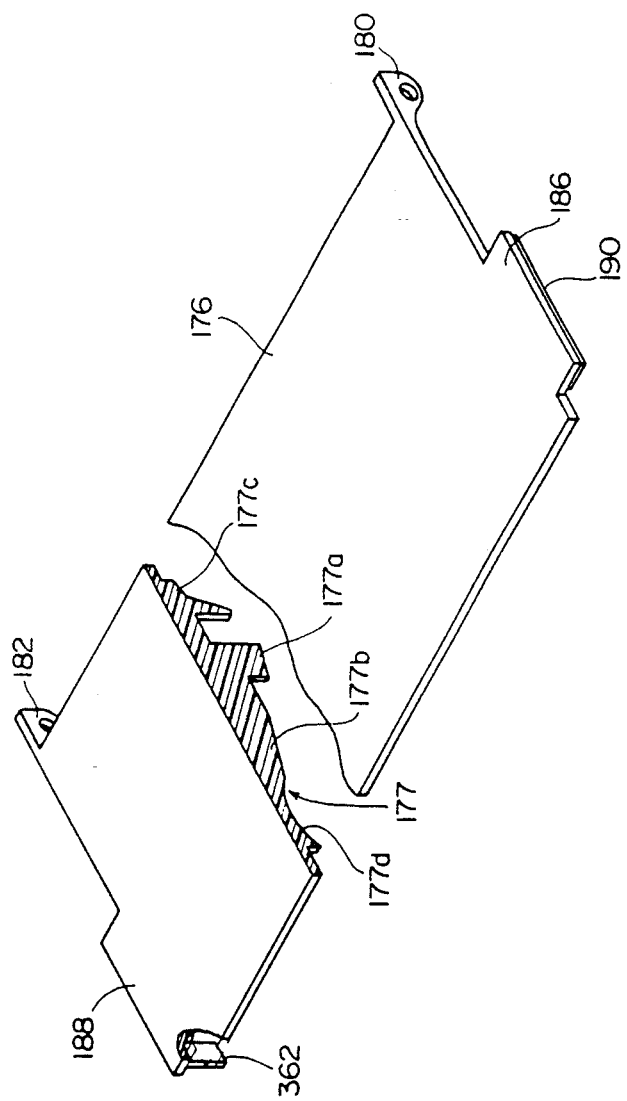
FIG. 8 is a perspective view showing an upper opening-closing cover, partly cut away, in the document delivering and re-introduction section of FIG. 4.

Mainly with reference to FIGS. 4 to 8, the intermediate supporting member 106 in the document delivering and re-introduction section 16 includes a pair of vertical base plates 172 and 174 disposed with a space in the front-rear direction (in a direction perpendicular to the sheet surface in FIG. 3 and in a direction from right bottom to left top in FIGS. 4 and 5). The front supporting member 102 (not shown in FIGS. 4 and 5) is disposed in front of the vertical base plate 172, and the rear supporting member 104 is disposed in the rear side of the other vertical base plate 174. The intermediate supporting member 106 has an upper opening-closing cover 176 and a left end wall 178 in addition to the right end wall 144. The right end wall 144 is fixed between the vertical base plates 172 and 174. The upper opening-closing cover 176 constituting the first opening-closing member is comprised of a rectangular member, and, on both end portions of the cover 176 are provided supporting projections 180 and 182 projecting in the right upward direction in FIGS. 4 and 8. The upper opening-closing cover 176 is mounted pivotably between a closed position (the position shown in FIGS. 1 to 3 and 11) and an open position (position shown in FIGS. 12 to 14) by inserting pins 184 (FIG. 11) implanted in the vertical based plates 172 and 174 into holes formed in the supporting projections 180 and 182. In both end portions of the upper opening-closing cover 176, abutting projecting portions 186 and 188 projecting on both sides are provided, and on the under surfaces of the abutting projecting portions 186 and 188, relatively thin rectangular permanent magnets 190 (only one of them is shown in FIGS. 4 and 8) are fixed. On the inside surface of the upper opening-closing cover 176, a plurality of guiding protrusions 177 are provided at spaced intervals in a direction perpendicular to the sheet surface in FIGS. 3 and 11 (the direction from right bottom to the left top; in FIG. 8). The guiding protrusions 177 extend in the left-right direction over the nearly entire width of the opening-closing cover 176. In nearly the central portion of the cover 176, a protrusion 177a protruding downwardly is provided. To increase the strength of the upper opening-closing cover 176, a reinforcing member 179 (FIG. 11) is provided through these guiding protrusions.

Figure 10:
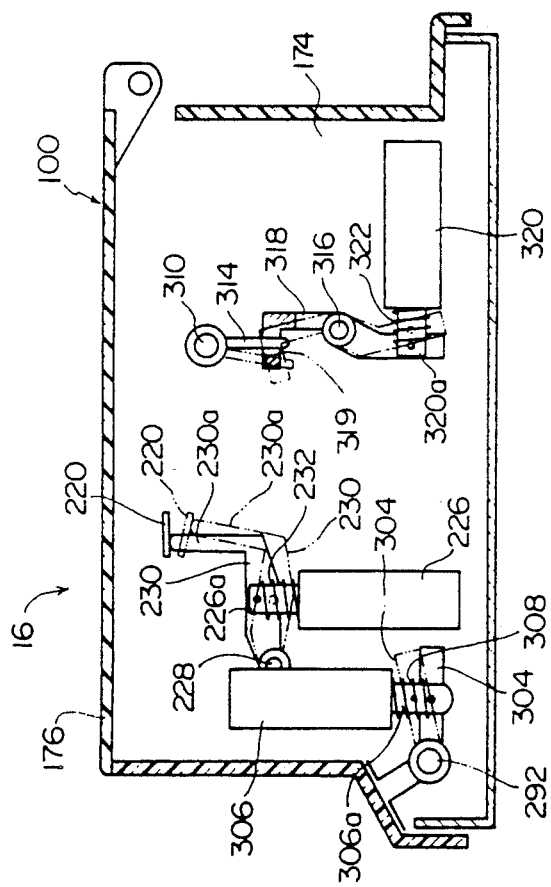
FIG. 10 is a sectional view of various actuating means provided in the document delivering and re-introduction section.

The right end wall 178 is mounted on a pivoting unit 200 mounted detachably between the vertical base plates 172 and 174. The pivoting unit 200 constituting the second opening-closing member is provided with a pair of end walls 202 and 204 disposed with an interval in the front-rear direction, and a left end wall 178 is fixed to the left end in FIGS. 3 and 4 of a pair of end walls 202 and 204. In the illustrated embodiment, the discharging-re-introduction switching means 138, the first document discharge roller 140, the re-introduction auxiliary roller 120 and the restriction plate 112 are mounted between the end walls 202 and 204. The discharging re-introduction switching means 138 is provided with a supporting shaft 206 and a switching member 208 mounted on the supporting shaft 206 at an interval in the axial direction. Both end portions of the supporting shaft 206 are mounted rotatably on the end walls 202 and 204 via a bearing 210. The discharging re-introduction switching member 208 has a substantially flat upper surface. On one end portion thereof, a downwardly projecting protrusion 212 is provided. The under surface of the protrusion 212 extends arcuately toward the other end. The upper surface of the discharging re-introduction switching member 208, as is apparent from the following description, defines an upper guiding inside surface 214 for guiding the document toward the first document receiving tray 94, and its arcuate under surface defines an arcuate guiding surface 216 for guiding the document toward the transparent plate 8. One end portion of the supporting shaft 206 extends through the end wall 204 and projects rearwardly, and to its projecting end portion is fixed a lever member 218. The lever member 218 extends to the right direction in FIGS. 3 and 4 along the end wall 204. The lever member 218 has provided therein an actuating piece 220 and an upper projecting portion 222. An inwardly projecting positioning pin 224 is fixed to the upper projecting portion. In relation to the lever member 218, an actuating means is provided to position the discharging re-introduction switching means 138 selectively at a discharging position and a re-introducing position. With reference to FIG. 10 also, in the illustrated embodiment, the actuating means is comprised of an electromagnetic solenoid 226, and the electromagnetic solenoid 226 is secured to the outside surface of the end wall 204. Furthermore, via pin 228, an actuating arm 230 is pivotably mounted on the outer surface of the end wall 204. The free end portion 230a extending upwardly of the actuating arm 230 acts on the actuating piece 220 of the lever member 218 from below. The output shaft 226a of the electromagnetic solenoid 226 is pivotably connected to the actuating arm 230, and between the electromagnetic solenoid 226 and the actuating arm 230 is interposed a coil spring 232 for biasing the actuating arm 230 counterclockwise in FIG. 10. Because of the above-mentioned construction, when the electromagnetic solenoid 226 is deenergized, the action of the coil spring 232 maintains the actuating arm 230 at a first angular position shown by a solid line in FIG. 10. At this first angular position, the free end portion 230a of the actuating arm 230 acts on the actuating piece 220 to move it upwardly. Thus, the discharging re-introduction switching member 208 is held at a re-introduction position (the position shown in FIGS. 4 and 6, and by a solid line in FIGS. 3 and 11). When the electromagnetic solenoid 226 is energized, the actuating arm 230 is pivoted clockwise in FIG. 10 against the biasing action of the coil spring 232, and it is held at a second angular position shown by a two-dot chain line from the first angular position. Thus, with the lowering of the free end portion 230a of the actuating arm 230, the discharging re-introduction switching member 208 is, by its own weight, pivoted clockwise in FIGS. 3 and 11 integrally as a unit with the supporting shaft 206. A pin 224 provided in the lever member 218 abuts against the upper edge of the end wall whereby it is held at a discharging position (the position shown by a two-dot chain line in FIGS. 3 and 11). The first document discharging roller 140 is comprised of a rotating shaft 234 and a discharge roller member 236 mounted on the rotating shaft 234 at intervals in the axial direction. Both end portions of the rotating shaft 234 are supported rotatably on the end walls 202 and 204 via a bearing 238. The re-introduction auxiliary roller 120 is also comprised of a rotating shaft 242 and a roller member 244 disposed at intervals in the axial direction on the rotating shaft 242, and both end portions of the rotating shaft 242 is rotatably supported between the end walls 202 and 204 via a bearing 246. The restriction plate 112 is fixed between the lower end parts of the end walls 202 and 204, and its main portion extends to the left and inclined downwardly in a straightline in FIGS. 3 and 11. Between the upper end portions of the end walls 202 and 204 is further mounted a guiding member 248, and its main portion 248a extends substantially horizontally. In the specific embodiment, a rectangular cut is formed in the main portion 248a, and within the cut is arranged a discharge roller member 236 of the first document discharging roller 140, and stepped portion for the discharging re-introduction switching member 208 is formed at both side portions of the cut (FIG. 6). A charge eliminating device 250 is provided in the suspending portion 238b of the guiding member 248. The charge eliminating brush 252 projects upwardly beyond the main portion 248a of the guiding member 248. As will be readily understood from the description given below, the charge eliminating brush 252, acts on the document to be discharged through the first branched passage 126 to eliminate the charge. In the right end portion of each of the end walls 202 and 204 in FIGS. 4, 6 and 11, elongated cuts 254 and 256 extending downwardly to the left are formed. On the other hand, corresponding to the cuts 254 and 256, inwardly projecting supporting pins 258 (only one supporting pin fixed to the vertical base plate 174 is shown in FIGS. 4, 5 and 11) are implanted. By positioning the supporting pins 258 in the cuts 254 and 256 of the end walls 202 and 204, the pivoting unit 200 is mounted pivotably between the vertical base plates 172 and 174 and pivotably disposed between a closed position (shown in FIGS. 3, 11 and 12) and an open position (shown in FIGS. 13 and 14).

The delivery main roller 116 in the document delivery means 114 is composed of a rotating shaft 260 and a large-diameter roller member 262 disposed at intervals in the axially direction on the rotating shaft 260. On the rotating shaft 260 is pivotably mounted a pivot member 264 constituting a third opening-closing member. The pivoting member 264 is provided with plate-like members 266 disposed on both sides of the large-diameter roller member 262 at an interval in the axial direction of the rotating axis 260. As shown in FIG. 11, adjacent plate-like members 266 (specifically the plate-like members 266 not having large-diameter roller member 262 therebetween) have their one end portion connected via connecting portions 268, 270, 272 and 274. The nearly semi-circular cylindrical connecting portion 272 is opened to below. The other end portions of the adjacent plate-like members 266 (all plate-like members 266) are connected to each other via the connection portions 276, 278 and 280. In the illustrated embodiments, downwardly projecting ribs 282 and 284 are provided in the lower end of the plate-like member 266 and the under surface of the connecting portion 278. These ribs 282 and 284 extends in the delivering direction of documents, namely in the left-right direction in FIG. 11. The ribs 284 provided in the plate-like members 266 on both sides project somewhat more downwardly than other rib 282 (the ribs provided in the plate-like member 266 and the rib provided in the connecting portion 278). As will be described later, the rib 284 acts as a positioning rib, and the other rib 282, as a document guiding rib. At the upper ends of both plate-like members 266, upwardly projecting positioning protrusions 286 are provided. By positioning the connecting portion 272 on the rotating shaft 260 from above, the pivoting member 264 is mounted pivotably on the delivery main roller 116 (the plate-like member 266 has an upwardly extending cut so that it can be mounted) (FIG. 11). By supporting both end portions of the rotating shaft 260 on the vertical base plates 172 and 174 via a bearing 290 the delivery main roller 116 and the pivoting member 264 are mounted as required beneath the pivoting unit 200. In the so mounted state, the pivoting member 264 can pivot between a closed position (the position shown in FIGS. 3, and 11 to 13) and an open position (the position shown in FIG. 14).

The restriction plates 108 and 110, the delivering re-introduction switching means 134, and the branched passage switching means 136 are directly mounted between the vertical base plates 172 and 174. The reaction plate 108 is disposed beneath the pivoting member 264, and fixed between the lower end portions of the vertical base plates 172 and 174.

An opening for the delivery auxiliary roller 118 is formed in one end portion of the restricting plate 108 (FIG. 11). The restriction plate 110 is arranged on the right side of the delivery main roller 116 in FIGS. 3 to 11, and fixed to an intermediate portion in the up-and down direction of the vertical base portions 172 and 174. The restriction plate 110 extends upwardly in an arcuate fashion from one end of the restriction plate 108 along the surrounding of the delivery main roller 116. The delivering re-introduction switching means 134 includes a supporting shaft 292 and a plurality of delivering re-introduction switching members 294 mounted on the supporting shaft 292 in a spaced-apart relationship in the axial direction. As shown in FIG. 5, the delivering re-introduction switching member 294 includes a rectangular main portion 296 and nearly triangular projecting portions 298 projecting upwardly from both side ends, and the projecting portions 298 are mounted on the supporting shaft 292 via a cylinder-shaped member 300. As will be understood from the description given below, the under surface of the main portion 296 guides the document toward the common passage 124 of the document delivery passage, and the upper end surface of the projecting portion 298 guides the document towards the transparent plate 8. The both end portions of the supporting shaft 292 of the delivering re-introduction switching means 134 are supported rotatably between the vertical base plates 172 and 174 via a bearing 302. One end portion of the supporting shaft 292 projects rearwardly through the vertical base plate 174, and a lever 304 (FIG. 10) is mounted on the projecting end portion. An electromagnetic solenoid 306 constituting an actuating means is mounted as shown in FIG. 10 on the rear surface of the vertical base plate 174, and the output shaft 306a of the electromagnetic solenoid 306 is linked pivotally to the lever 304. Furthermore, a coil spring 308 is interposed between the electromagnetic solenoids 306 and the lever 304. Because of the foregoing construction, when the electromagnetic solenoid 306 is in the deenergized state, the action of the coil spring 308 maintains the lever 304 at a first angular position shown by a solid line in FIG. 10. As a result, the delivering re-introduction switching member 294 is held at the delivery position (the position shown by a solid line in FIGS. 3 and 11 and also shown in FIGS. 12 to 14). When the electromagnetic solenoid 306 is energized, the lever 304 is pivoted counterclockwise in FIG. 10 to a second angular position shown by a two-dot chain line, and thereby the delivering re-introduction switching member 294 is held at the re-introduction position (the position shown by a two-dot chain line in FIGS. 3 and 11). The branched passage switching means 136 is provided with a supporting shaft 310 and a branched passage switching member 312 mounted axially on the supporting shaft 310 in a spaced-apart relationship, and both end portions of the supporting shaft 310 are rotatably supported on the vertical base plates 172 and 174 via bearings 13 (only one of which is shown in FIG. 5). The branched passage switching member 312 is elongated and nearly triangular. Its upper portion is fixed to the supporting shaft 310, and one end surface 312a (the left surface in FIGS. 5 and 11) extends downwardly in an arcuate shape along the peripheral surface of the delivery main roller 116. The other end surface 312b (the right surface in FIGS. 5 and 11) extends downwardly in an arcuate shape toward the delivery main roller 116. One end surface of a branched passage switching member 312 guides the document toward the first branched passage 126, and its other end surface guides the document toward the second branched passage 130. One end portion of the supporting shaft 310 projects rearwardly through the vertical base plate 174, and an arm 314 is mounted on the projecting end portion. An actuating lever 318 is mounted on the rear surface of the vertical base plate 174 via a pin 316. A hole 319 is formed in one end portion of the actuating lever 318. The free end portion of the arm 314 is received in the hole 319. Furthermore, an electromagnetic solenoid 320 constituting an actuating means is mounted on the vertical base plate 174, and its output shaft 320a is pivotally connected to the other end portion of the actuating lever 318. A coil spring 322 is interposed between the electromagnetic solenoid 320 and the other end portion of the actuating lever 318. Because of this construction, when the electromagnetic solenoid 320 is deenergized, the actuating lever 318 is held at the first angular position shown by a solid line in FIG. 10 by the action of the coil spring lever 322. As a result, the branched passage switching member 312 is maintained at the first branched position (the position shown in FIGS. 3 and 14 by a solid line and the position shown in FIGS. 12 and 14 via the arm 314 and the supporting shaft 310 (in a specific example, a plurality of rectangular openings are formed in the upper end portion of the restriction plate 110 in order to permit positioning of the branched passage switching member 312 at the first branched position). When the electromagnetic solenoid 320 is energized, the actuating lever 318 is pivoted to a second angular position shown by a two-dot chain line counterclockwise in FIG. 10, whereby the arm 314 is pivoted clockwise, and the branched passage switching member 312 is held at the second branched position (the position shown by a position shown by a two-dot chain line in FIGS. 3 and 11).

Between the vertical base plates 172 and 174 are further mounted a delivery auxiliary roller 118, a second document discharge roller 142 and a guiding member 324. The delivery auxiliary roller 118 is comprised of a rotating shaft 326 and a plurality of roller members 328 mounted at intervals in the axial direction, and both end portions of the rotating shaft 326 are rotatably supported on the vertical base plates 172 and 174 via bearings. The second document discharging roller 142 is comprised of a rotating shaft 330 and a plurality of discharge roller members 332 mounted in a spaced-apart relationship axially on the rotating shaft 330. The rotating shaft 330 is rotatably supported on the vertical base plates 172 and 174 via bearings (not shown). (FIG.

11). The guiding member 324 has an inclined guiding portion 336 and an upper guiding portion 338, and is fixed to the right end upper portion of the vertical base plates 172 and 174. Further, a plurality of rectangular openings are formed in the upper guiding portion 338, and projects upwardly through the openings corresponding to the discharge roller member 332 of the second document discharge roller 142. At the right end of the upper guiding portion 338 is provided a downwardly extending suspension member 340. A charge eliminator 342 is also fixed to the suspension member 340. The charge-eliminating brush 344 projects upwardly beyond the upper guiding portion 338 of the guiding member 324. As will be easily understood, the charge-eliminating brush 344 acts on the document discharged through the second branched passage 130 to eliminate the charge.

Figure 9:
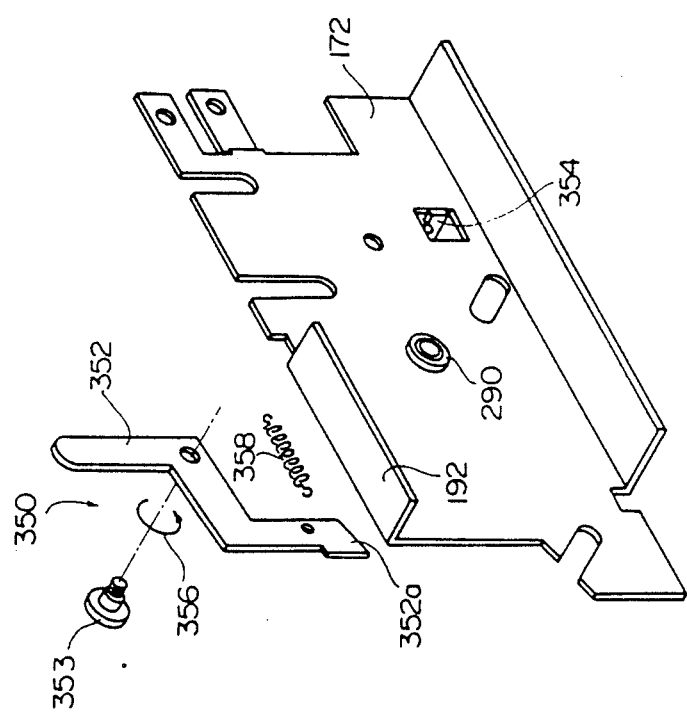
FIG. 9 is a perspective view showing a press-contact releasing means and its related elements which are provided in the document delivering and re-introduction section as they are shown in the exploded state.

In a specific embodiment, the re-introduction auxiliary roller 120 is mounted slightly movably in a direction toward and away from the delivery main roller 116, and by its own weight, makes contact with the peripheral surface of the discharge main roller 116. The delivery auxiliary roller 118 is mounted slightly movably toward and away from the delivery main roller 116. On both end portions of the rotating shaft 326 of the delivery auxiliary roller 118, a biasing spring (not shown) for biasing the rotating shaft 326 in a direction approaching the delivery main roller 116 is disposed (the biasing spring is formed of, for example, a coil spring, and astride the rotating shaft 326, both end portions of the coil spring are mounted on the vertical base plates 172 and 174). The delivery auxiliary roller 118 is elastically in pressure contact with the surface of the delivery main roller 116 by the action of the biasing spring. Hence, when the delivery main roller 116 is rotated in the direction shown by an arrow 122, the re-introduction auxiliary roller 120 and the delivery auxiliary roller 118 are driven in directions shown by arrows 346 and 348 (FIG. 11). Having regard to the delivery auxiliary roller 118, a press contact releasing means 350 is disposed. With reference to FIGS. 3, 5 and 9, the pressure contact releasing means 350 is disposed on both end portions of the delivery auxiliary roller 118, and its both end portions are moved in a direction away from the delivery main roller 116. In more detail, the press contact releasing means 350 is provided with a press contact releasing lever 352, and the intermediate portion of the press contact releasing lever 352 is pivotally mounted on the inside of the vertical base plate 172 (174) via fixing screws 353. One end portion of the press contact releasing lever 352 extends in a straightline fashion. Its other end portion extends in a nearly L-shape, and an actuating portion 352a is provided in the other end. Between the other end portion of the press contact releasing lever 352 and an engaging portion 354 provided in the vertical base plate 172 (174) a biasing coil spring 358 (constituting a biasing means) is interposed for biasing the press contact releasing lever 352 in the direction shown by an arrow 356 (counterclockwise in FIGS. 5 and 9). Accordingly, when the upper opening-closing cover 176 does not act on the press contact releasing lever 352 (for example, when it is maintained at the open position), the press contact releasing lever 352 is pivoted in a direction shown by an arrow 356 by the action of the biasing coil spring 358. Its acting portion 352a acts on the delivery auxiliary roller 118 (in the specific embodiment, the acting portion 352a abuts against the bearing supporting the roller 118, and acts on the roller 118 via the bearing). Thus, the delivery auxiliary roller 118 is moved away from the delivery main roller 116 against the action of the biasing spring (not shown). On the other hand, when the upper opening-closing member 176 is brought to the closed position, the opening-closing cover 176 acts on one end portion of the press contact releasing lever 352 to pivot it in a direction opposite to the direction of arrow 356 whereby the acting portion 352a is away from the delivery auxiliary roller 118, and thus the delivery auxiliary roller 118 is kept in press contact with the delivery main roller 116 by the action of the biasing spring.

When the document is delivered as is required, the various constituent elements are maintained in the states shown in FIGS. 3 and 11. The pivoting member 264 is held at the closed position. At the closed position, ribs 284 provided in the plate-like members 266 located on both sides abut against the upper surface of the restricting plate 108. Thus the pivoting movement of the pivoting member 264 beyond the closed position is accurately hampered. The pivoting unit 200 is also maintained at the closed position. In the closed position, the main portion of the restricting member 112 abuts against a positioning protrusion 286 provided at the upper end of the plate-like member 266, thereby accurately hampering the pivoting movement of the pivoting unit 200 beyond the closed position. Furthermore, the upper opening-closing cover 176 is also maintained at the above closed position. In the above closed position, permanent magnets 190 provided in the abutting protrusions 186 and 188 abut against the outside bent portions 192 and 194 provided at upper ends of the vertical base plates 172 and 174 to thereby accurately hamper the pivoting movement of the upper opening-closing cover 176 beyond the closed position. In such a closed position, the permanent magnets 190 are magnetically attracted to the outwardly bent portions 192 and 194 to maintain the upper opening-closing cover 176 at the above closed position by its own weight and the magnetic attracting force.

The various constituent elements define a document delivery passage as shown in FIG. 11. Specifically, one side (lower side) of the common passage 124 of the document delivery passage is defined by the restriction plates 108 and 110. Its other side (upper side) is defined by the lower ends of a plurality of plate-like members 266 and part of the delivery main roller 116 in the pivoting member 264. One side (under side) of the first branched passage of the document delivery passage is defined by part of the delivery main roller 116, the discharge re-introduction switching member 208 and the main portion 248a of the guiding member 248, and the other side (upper side) is defined by a branched passage switching member 312, a projecting portion 177a provided in a guiding protrusion 177 which is provided in the upper opening-closing cover 176, and a site 177b extending to the left side in FIG. 11 from the projecting portion 177a. One side (under side) of the second branched passage 130 of the document delivery passage is defined by an inclined guiding portion 336 and an upper guiding portion 338 of the guiding member 324, and its other side (upper side) is defined by the branched passage switching member 312, and the site 177c existing in the right side in FIG. 11 of the projecting portion 177a in the guiding protrusion 177. The one side (under side) of the re-introduction passage 132 is defined by part of the delivery main roller 116 and the upper end of the plate-like members 266 in the pivoting member 264, and its other side (upper side) is defined by the discharge re-introduction switching member 208 and the restriction plate 112 mounted on the pivoting unit 200.

The common passage 124, the first branched passage 120, the second branched passage 130 and the re-introduction passage 132 in the document discharge passage can be opened in the following manner.

Figure 12:
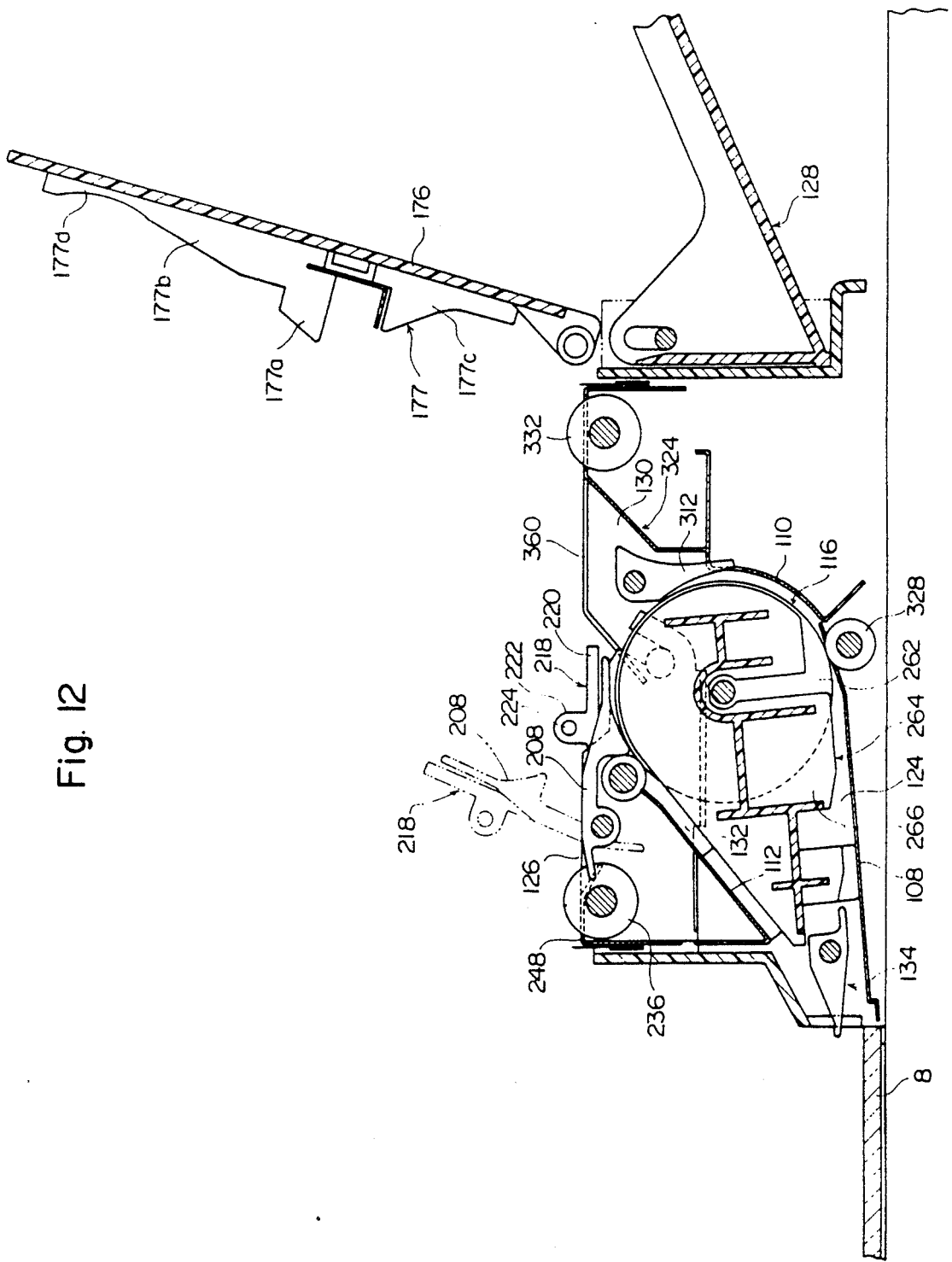

With reference to FIGS. 11 to 14, when the upper opening-closing cover 176 is pivoted clockwise from the closed position shown in FIG. 11 to the open position shown in FIG. 12, some parts of supporting projections 180 and 182 (substantially flat sites) provided in the upper opening-closing cover 176 abuts against abutting portions 196 and 198 (FIG. 4) provided at the upper end of the right end wall 144 whereby the pivoting movement of the upper opening-closing cover beyond the open position is surely hampered. When the upper opening-closing cover 176 is thus maintained in the open position, the upper sides of a greater portion of the first branched passage 126 and a greater portion of the second branched passage 130 are opened as is required. Thus, should jamming of the document occur in the first or second branched passage 126 or 130, the document can be easily removed without breakage. In the specific embodiment, the projecting portion 177a provided in the guiding protrusion 177 of the upper opening-closing 176 is positioned between the branched switching means 136 and the discharge re-introduction switching means 138 to define part of the first branched passage 126. Accordingly, when the upper opening-closing cover 176 is held in the open position, an area between the branched passage switching means 136 and the branched passage switching means 136 and the discharge re-introduction switching means 138 is fully opened. This also makes it easy to remove the jamming document at upstream site of the discharge re-introduction switching means 138. Further, as stated above, when the upper opening-closing cover 176 is held at the open position, it does not act on the press contact releasing lever 352. Accordingly, the press contact releasing lever 352 acts on the discharge auxiliary roller 118 to separate it in a direction isolated from the delivery main roller 116 (the press contact states of the delivery auxiliary roller 118 and the delivery main roller 116 is released). Accordingly, should a document jam up between the two rollers 116 and 118, it can be easily removed without breakage. When the upper opening-closing cover 176 is maintained at the open position, the discharging re-introduction switching member 208 can be pivoted from the discharge position shown by a solid line counterclockwise to a position shown, for example, by a two-dot chain line. When the discharging re-introduction switching member 208 is thus pivoted, the upstream portion in the re-introduction passage 132 is also kept open. Accordingly, even if the document jams up in the state where its leading end is introduced into the re-introduction passage 132, the document can be easily removed.

Figure 13:
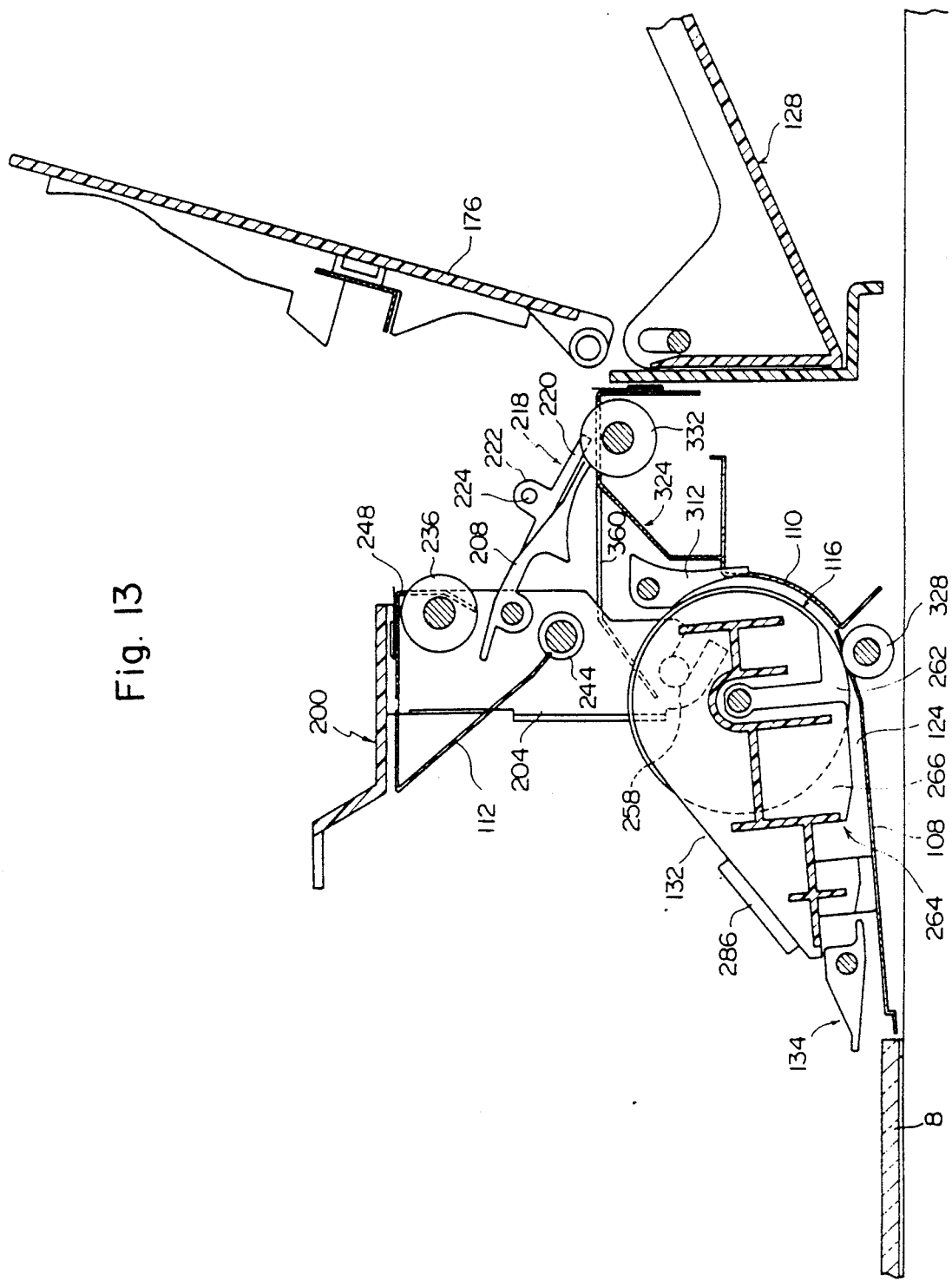

When while the upper opening-closing cover 176 is held at the open position, the pivoting unit 200 is then pivoted from the closed position shown in FIG. 12 clockwise to the open position shown in FIG. 13, the end walls 202 and 204 of the pivoting unit 200 abut against the both end portions of the supporting shaft 310 in the branched passage switching means 136, and thereby, the pivoting movement of the pivoting unit 200 beyond the open position can be surely hampered.

When the pivot unit 200 is held thus in the open position, a greater portion of the re-introduction passage 132 is opened as shown in FIG. 13, and thus, the document which jams up in the re-introduction passage 132 can be easily removed without breakage.

When with the pivoting of the pivoting unit 200, the discharging re-introduction switching member 208 freely pivots clockwise in FIG. 13, the forward end portions of these elements act so as to bite into the document which jams up in the upstream portion of the first branched passage 126, and therefore, the jamming document is likely to break. To cope with this situation, a revolving hampering guiding portion 360 is provided at the rear end portion of the guiding member 324 in the specific embodiment. The revolving hampering guiding portion 360 extends substantially horizontally from toward the discharge re-introduction switching means 138 from the upper guiding portion 338 of the guiding member 324, and its free end portion extends downwardly inclinedly. Because of this construction, when the pivoting unit 200 is pivoted toward the open position, the forward end portion of the lever member 218 in the discharge re-introduction switching means 138 contacts the revolving hampering guiding portion 360 and is moved along its upper surface, and the pivoting movement of the discharging re-introduction switching member 208 beyond the angular position shown in FIG. 13 is surely hampered. Thus, the breakage of the document by the discharging re-introduction switching member 208 can be prevented.

Figure 14:
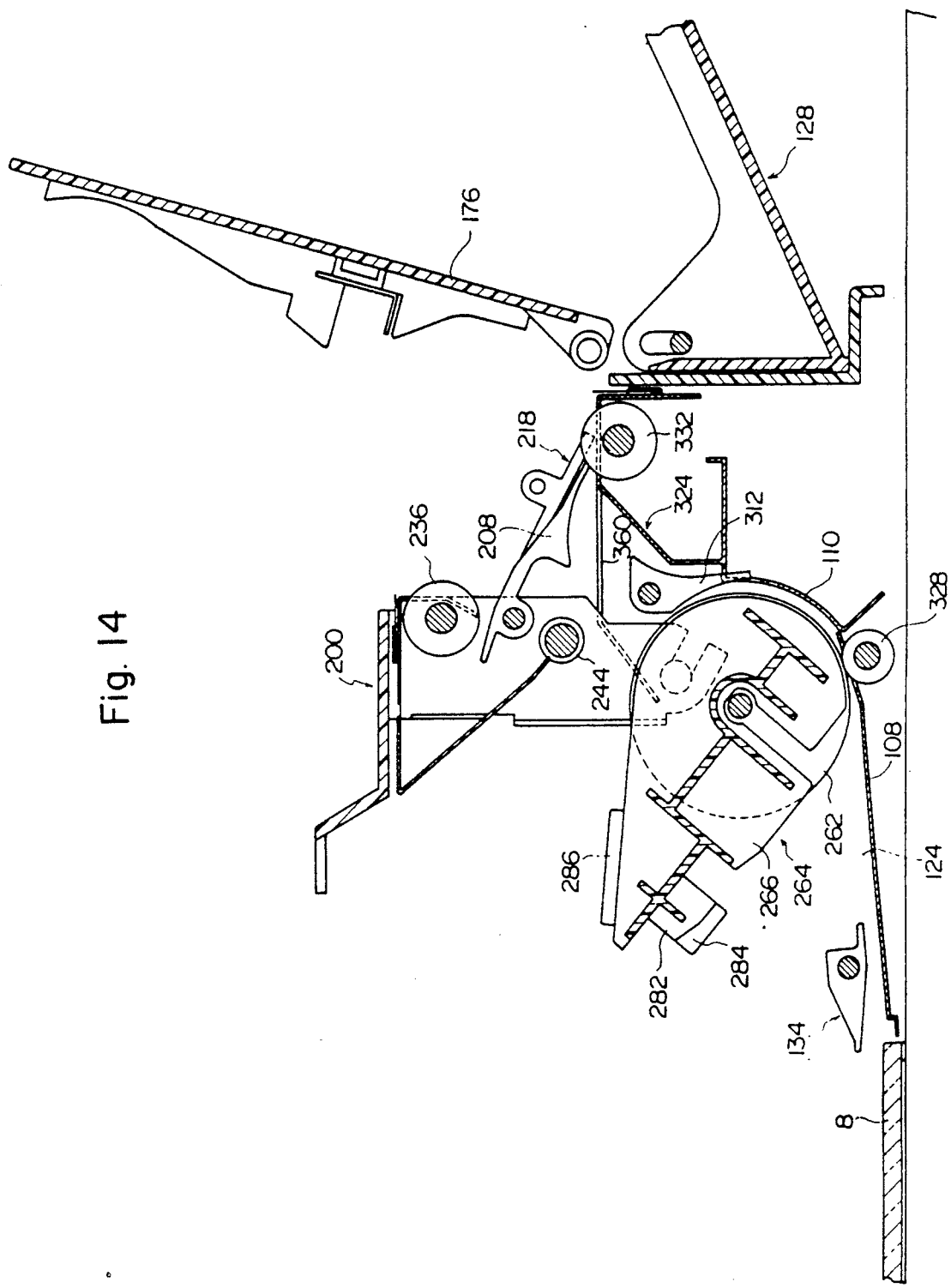

When the upper opening-closing cover 176 and the pivoting unit 200 are maintained at the open position, the pivoting member 264 can be pivoted clockwise from the closed position shown by a solid line in FIG. 13, as shown in FIG. 14. When the pivoting member 264 is pivoted to the open position shown, for example, in FIG. 14, a greater portion of the common passage 124 is opened. Thus, the document which has jammed up in the common passage 124 can be easily removed without breakage.

To return the document delivering passage so opened to the original sate, the pivoting member 204 is pivoted counterclockwise in FIG. 14 to hold it at the closed position. Then, the pivoting unit 200 is pivoted counterclockwise in FIG. 14 and held at the closed position. Then, the upper opening-closing cover 176 is pivoted counterclockwise in FIG. 14 and held at the closed position. When the upper opening-closing cover 176 is held at the closed position, the permanent magnets 190 provided in the abuting projecting portions 186 and 188 abut against the outside bent portions 192 and 194 provided in the upper ends of the vertical base plates 172 and 174 and are magnetically attracted to them. Thus, the upper opening-closing cover 176 is magnetically held at the closed position. Furthermore, by so doing, the upper opening-closing cover 176 acts on the pressure releasing lever 352 to pivot it clockwise in FIG. 9. As a result, the press contact releasing lever 352 is isolated from the delivery auxiliary roller 118, and the delivery auxiliary roller 118 is kept into press contact with the delivery main roller 116. Furthermore, the suspending piece 362 (FIG. 4) provided in the upper opening-closing cover 176 acts on a safety switch (not shown) through a recess formed in the outside bent portion 194 of the vertical base plate 174, and the safety switch is turned off.

Driving system

Figure 15:
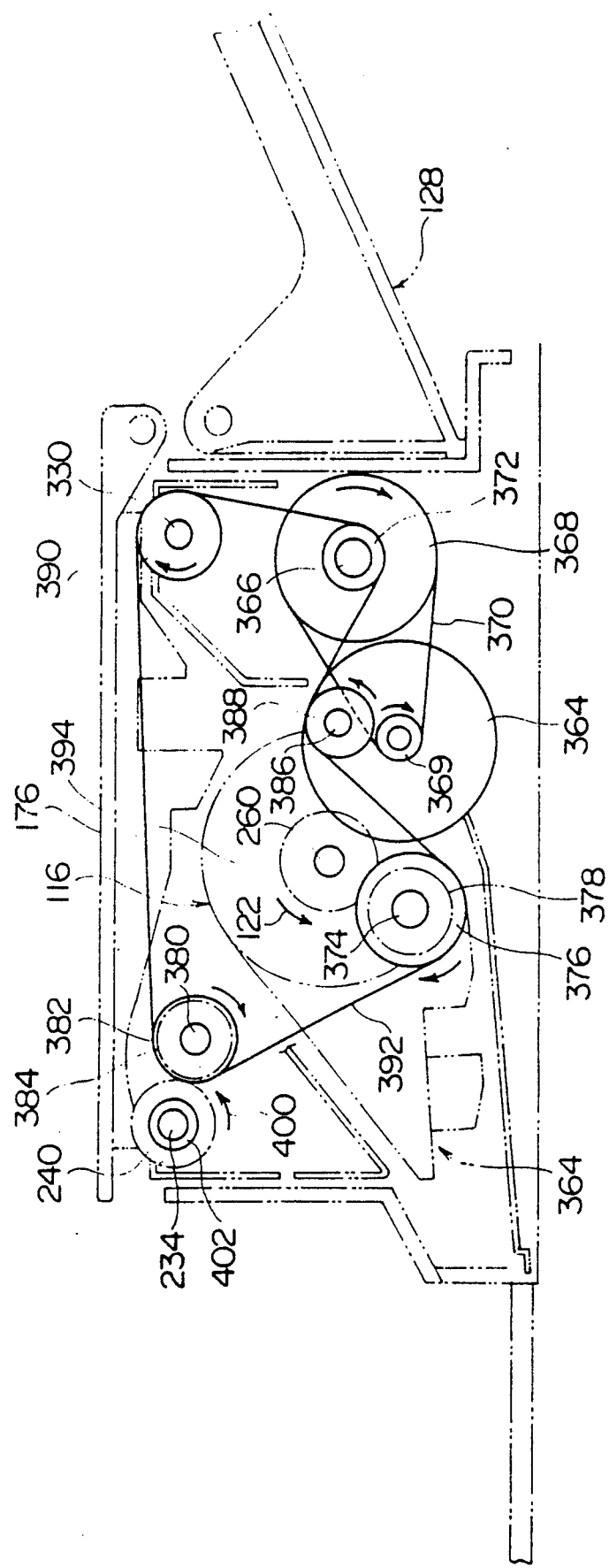
FIG. 15 is a view showing the drive systems for the document delivering and re-introduction section.

With reference mainly to FIG. 15, the driving system will be described. A major portion of the driving system is disposed within the rear supporting member 104. In the specific example, an electric motor 364 constituting the drive means is mounted on a supporting plate (not shown) fixed to the rear supporting member 104. A short rod 366 is implanted on the outside surface of the vertical base plate 174, and a belt 370 is wrapped between a large pulley 368 mounted on the short rod 366 and an output pulley 369 fixed to the output shaft of the electric motor 364. A small pulley 372 is mounted on the short rod 366. A shaft member 374 is implanted in the outside surface of the vertical base plate 174, and a transmission pulley 376 and a gear 378 are mounted on the shaft member 374. A shaft member 380 is rotatably mounted via a bearing 381 through the vertical base plate 174. A pulley 382 is mounted on one end portion of the shaft member 380 (the one end portion projecting outwardly from the vertical base plate 174), and to its other end portion (the other end portion projecting inwardly from the vertical base plate 174) a gear 384 (see FIGS. 4 and 5) is mounted. A small pulley 372, a tension pulley 388 pivotally mounted on the vertical base plate 174 via a shaft 386, a transmission pulley 376, a pulley 382 and a pulley 390 mounted on the supporting shaft 330 of the second document discharge roller 142 (the site projecting rearwardly through the vertical base plate 174) are drivingly connected by a belt 392. Because of this construction, when the electric motor 364 is energized, the pulleys are revolved in the direction shown by an arrow shown in FIG. 15 via belts 370 and 392. The rotating shaft 260 of the delivery main roller 116 projects rearwardly through the vertical base plate 174, and a gear 394 is mounted on the projecting end portion (FIGS. 4 and 7). The gear 394 is in mesh with a gear 378. Accordingly, when the transmission pulley 376 is revolved in the direction shown by an arrow, the delivery main roller 116 is revolved in a direction shown by an arrow 12 (see FIG. 3 also) via gears 378 and 394. The rotating shaft 234 of the first document discharge roller 140 projects rearwardly through the end wall 204, and a gear 240 is mounted also on the projecting end portion (see FIGS. 4 and 7). This gear 240 is in mesh with the gear 384. Accordingly, when the pulley 382 is rotated in the direction of an arrow, the first document discharge roller 140 is revolved in the direction shown by an arrow 400 (FIG. 15) via gears 384 and 240.

In a specific embodiment, the rotating peripheral speed of the delivery main roller 116 is set such that it is substantially the same as the rotating peripheral speed of the document discharge roller 142, (it will be easily understood that the rotating peripheral speeds of the delivery auxiliary roller 118 and the re-introduction auxiliary roller 120 acting in cooperation with the delivery main roller 116 are substantially equal to the rotating peripheral speed of the delivery main roller 116), but the peripheral speed of the first document discharge roller 140 is desirably at a larger speed than the peripheral speed of the first document discharge roller 140. Desirably, the peripheral speed of the first document discharge roller 140 is set, for example, at about ⅔ of the peripheral speed of the delivery main roller 116. Having regard to the fact that the peripheral speed of the first document discharge roller 140 is set at a smaller peripheral speed of the delivery main roller 116, a known one-way clutch means 402 is interposed between the gear 240 and the rotating shaft 234 of the first document discharge roller 140. One-way clutch means 402 usually transmit the rotating driving force from the gear 240 to the rotating shaft 234 and rotates the first document discharge roller 140 at a relatively low speed. When the document fed through the first branched passage 126 acts on the first document feed roller 140, the transmission of the rotating driving force from the gear 240 is released. The rotating peripheral speed of the delivery main roller 116 is substantially the same as the rotating peripheral speed (or the moving speeds) of other rollers than the first document discharge roller 140, namely those of the delivery roller 52 of the document delivery means 42, the upper and lower rollers of the document introduction means 44 and the belt 88 of the document conveying means 74.

Because of the above construction, when the document is sent through the document introduction passage 40, the delivery passage defined between the transparent plate 8 and the endless belt 88, the common passage 124 and the second branched passage 130 in the document discharge passage and the re-introduction passage 132, it is conveyed at a relatively high predetermined velocity. When the document is fed through the first branched passage 126, initially (when the document is conveyed while undergoing the action of the delivery main roller 116 and the delivery auxiliary roller 118), the document is moved at a relatively high predetermined speed (at which time, the first document discharge roller 140 is revolved by undergoing the action of the document moved at a relatively high speed instead of the rotating force transmitted via the one-way clutch means 402 from the electric motor 364). Thereafter, (after the trailing end of the document has passed the nipping site of the delivery main roller 116 and the delivery auxiliary roller 118), the document is conveyed at a relatively low speed by the action of the first document discharge roller 140 rotated by the revolving force transmitted from the electric motor 364 via the one-way clutch means 402. Accordingly, when the document is to be discharged to the first document receiving tray 94 through the first branched passage 26, it is discharged at a relatively low speed. Hence, at such a discharging time, the document is not disturbed, and the discharged document is stocked on the first document receiving tray 94 in the stacked state. In the specific embodiment, the rotating peripheral speed of the first document discharging roller 140 present in the downstream end of the first branched passage 126 is made slower. In addition to it, the rotating peripheral speed of the second document discharging roller 142 existing in the downstream end of the second branched passage 130 can also be made slower.

With regard to the construction described above, the first document discharging roller 140 is preferably constructed as shown below. Specifically, at least the peripheral surface of the discharge roller member 236 of the first document discharge roller 140 is preferably formed from a material having a relatively low coefficient of friction. In the specific embodiment, the entire discharge roller member 36 is formed of flexible foamed urethane. By using this construction, when the document is fed at a relatively high speed by the action of the delivery main roller 16 and the delivery auxiliary roller 118, slippage is created between the document and the discharge roller member 236, and thus, damage by bending of the document can be surely prevented.

When the rotating peripheral speed of the second document discharging roller 142 is made slow, it is preferable to make the construction of the second document discharging roller 142 in the same way as in the first document discharging roller 140.

In the specific embodiment, the following construction is also employed so that the documents discharged through the first branched passage 126 are stocked in the stacked state in the first document receiving tray 94. As shown in FIGS. 8, 11 and 12, the left end portion in FIGS. 8 and 11 of the guiding protrusion 177 (provided in the inside surface of the upper opening-closing cover 176) positioned between the first document discharge roller 140 and the discharge roller member 236, that is to say, the site 177d defining the upper side of the downstream end portion of the first branched passage 126 extends downwardly in an arcuate shape toward the discharging direction of the document. Accordingly, the document to be fed through the first branched passage 126 is guided to the site 177d of the guiding protrusion 177 and discharged downwardly toward the first document receiving tray 94, and stocked in the stacked state on the first document receiving tray 94. This technique can achieve the desired effect even when used alone. A sufficient effect will be achieved by using it together with the technique of relatively slowing the peripheral speed of the first document discharging roller 140.

FIGS. 16 to 19 explains another embodiment of the pivoting unit 200 as a second opening-closing member. Except part of the pivoting unit 200, these drawings show substantially the same copying machine as shown in FIGS. 1 to 15. Accordingly, the same parts are represented by the same reference numerals, and only different portions will be described.

The discharge re-introduction switching means 138 and the re-introduction auxiliary roller 120 are mounted between the end walls 202 and 204 of the pivoting unit 200.

The discharge re-introduction switching means 138 is provided with a supporting shaft 206 and a discharge re-introduction switching member 208 mounted axially on the supporting shaft 206 in a spaced-apart relationship. Both end portions of the supporting shaft 206 are mounted rotatably via bearings between the end walls 202 and 204. A revolving restriction member 207 is fixed to end portions of the supporting shaft 206. The revolving restriction member 207 is constructed such that it extends projectingly radially outwardly of the supporting shaft 206.

On the other hand, the re-introduction auxiliary roller 120 is comprised of a rotating shaft 242 and a roller member 244 disposed axially on the rotating shaft 242 at a spaced-apart relationship. Both end portions of the rotating shaft 242 are mounted rotatably via a bearing 246 between end walls 202 and 204. The bearing 246 is supported slidably along a long slit 203 formed in each end wall. When the opening-closing members are at the closed position as shown in FIG. 17, the long slit 203 extends near the supporting shaft 206 of the discharge re-introduction switching member 208 downwardly inclinedly in a direction approaching the rotating shaft 260 of the delivery main roller 116.

When the pivoting unit 200 and other opening-closing member constructed as above are at the closed position shown in FIG. 17, the discharging re-introduction switching member 208 is positioned nearly horizontally, and the revolving restriction member 207 is positioned downwardly (see the position shown by a solid line in FIG. 16). The bearing 246 tends to slide downwardly by its own weight along the long slit 203. Hence, the roller member 244 by its own weight abuts against the roller member 262 constituting the delivery main roller 116, and can be correspondingly driven.

As shown in FIG. 18, when the upper opening-closing cover 176 as a first opening-closing member is held at a closed position and the delivery re-introduction switching member 298 is pivoted from the set position shown by a solid line to an open position shown by a two-dot chain line, the revolving restriction member 207 abuts against the rotating shaft 242 of the roller member 244 to hamper its further revolving (see the position shown by a two-dot chain line in FIG. 16). The range of revolving restriction of the discharge re-introduction switching member 208 by the revolving restriction member 207 is preset with a range in which the discharge re-introduction switching member 208 can be returned by its own weight to the initially set position when the external force of pivoting the switching member 208 is released. By this range setting, an operation of returning the switching member 208 from the open position to the initially set position is not required (the switching member 208 can be returned by its own weight).

As shown in FIG. 19, while the upper opening-closing cover 176 is held at the open position, the pivoting unit 200 can be pivoted around a supporting pin 258, and can be held at the open position. In the course of the pivoting movement of the pivoting unit 200 in the open direction, the rotating shaft 242 may be moved in a direction away from the supporting shaft 206 along the long slit 203 via the bearing 246. This makes the rotating shaft 242 move out of the revolving track of the revolving restricting member 207, and the revolving restriction of the discharging re-introduction switching member 208 is released. Accordingly, in the pivoting of the pivoting unit 200, the rotating shaft 242 can avoid interference with the rotation restricting member 207 whose revolution to the revolving hampering guiding portion 360 is hampered together with the discharge re-introduction switching member 208 by the revolving hampering guiding portion 360. In other words, the pivoting unit 200 can be kept open without damaging the revolving restriction member 207.

The pivoting action of returning each of the opening-closing members from the open positions shown in FIG. 19 to closed positions shown in FIG. 17 will be easily understood from the foregoing description, and its detailed description will be omitted.

In the examples given above the revolving restriction member 207 is provided in the supporting shaft 206, but should not be limited to it. For example, the revolving restriction member 208 may be provided in juxtaposition on the supporting shaft 206 for revolving together with it. For example, it may be provided in the discharge re-introduction switching member 208.

The member against which the revolving restriction member 207 abuts is not limited to the rotating shaft 242, and a member provided in juxtaposition, for example a bearing, amy give the same function.

While one specific embodiment of the document conveying device in accordance with this invention has been described, and the present invention should not be limited to such specific embodiment. It should be understood that various changes and modification are possible without departing from the scope of the invention described herein.

What we claim is:

1. An automatic document conveying device to be applied to an image-processing machine in which a transparent plate on which to place a document to be processed is disposed on the upper surface of a housing, said automatic document conveying device comprising
   a document table,
   a document introduction passage extending from the document table to one end edge of the transparent plate,
   a first document receiving tray,
   a second document receiving tray,
   a document delivering passage including a common passage extending from the other end edge of the transparent plate, a first branched passage extending from the downstream end of the common passage to the first document receiving tray and a second branched passage extending from the downstream end of the common passage to the second document receiving tray,
   a branched passage switching means which is to be selectively held at a first branched position at which the common passage in the document delivering passage is in communication with the first branched passage and at a second branched position at which the common passage in the document delivering passage is in communication with the second branched passage,
   a re-introduction passage branching from the first branched passage and extending to the other end portion of the transparent plate,
   a discharging re-introduction switching means for selectively holding a document advanced into the first branched passage at a discharge position for discharging it to the first document receiving tray through the first branched passage and a document advanced into the first branched passage at a re-introduction position for introducting it into the re-introducing passage,
   a document delivering means for delivering a plurality of documents placed on the document table one by one into the document introduction passage,
   a document introduction means for introducing a document delivered to the document introduction passage onto the transparent plate,
   a document conveying means for conveying the document along the transparent plate, and
   a document discharging means for discharging a document delivered to the common passage of the document delivering passage by the document conveying means to the first document receiving tray through the common passage and the first branched passage of the document delivering passage, or to the transparent plate through the common passage, the upstream portion of the first branched passage and the re-introduction passage of the document delivering passage, or to the second document receiving tray through the common opassage and the second branched passage of the document delivering passage; wherein
   one side of at least a greater portion of the first branched passage and one side of at least a greater portion of the second branched passage are defined by a first opening-closing member mounted pivotably between an open position and a closed position, the other side of at least a greater portion of the first branched passage of the document delivering passage and one side of at least a greater portion of the re-introduction passage are defined by a second opening-closing member pivotably mounted between an open position and a closed position, and when the first opening-closing member is held at the open position, at least a greater portion of the first branched passage and at least a greater portion of the second branched passage are opened, and when the second opening-closing member is maintained at the open position while the first opening-closing member is held at the open position, at least a greater portion of the re-introduction passage is opened.

2. The automatic document conveying device of claim 1 in which discharging re-introduction switching means is pivotably mounted on the second opening-closing member, a part of its upper surface defines the other side of a part of the first branched passage in the document delivering passage, and a part of its under surface defines the other side of a part of the re-introduction passage, and when the first opening-closing member is held at the open position and in this state, the discharging re-introduction switching means is pivoted in the opening direction, a part of the re-introduction passage is opened.

3. The automatic document conveying device of claim 2 in which a guiding member is disposed in relation to the discharging re-introduction switching means, and when the first opening-closing member is maintained in the open position and in this state the second opening-closing member is pivoted toward the open position, a part of the discharging re-introduction switching means is guided by the guiding member to hamper the pivoting movement of the discharging re-introduction means in a predetermined direction.

4. The automatic document conveying device of claim 1 in which the other side of at least a greater portion of the re-introduction passage and one side of at least a greater portion of the common passage are defined by a third opening-closing member mounted openably and closably, and when the first opening-closing member and the second opening-closing members are maintained at the open position and in this state the third opening-closing member is pivoted in the opening direction, at least a greater portion of the common passage of the document delivering passage is opened.

5. The automatic document conveying device of claim 4 in which the first opening-closing member, the second opening-closing member and the third opening-closing member are pivoted in a predetermined direction when the first branched passage and the second branched passage of the document delivering passage, the re-introduction passage and the common passage of the document passage are to be opened, and the discharging re-introduction switching means is pivoted in a direction opposite to the predetermined direction when a part of the re-introduction passage is opened.

6. The automatic document conveying device of claim 1 in which the document delivering means is provided with a delivery main roller to be rotatably driven in a predetermined direction, around the delivery main roller are arranged the branched passage switching means and the discharge re-introduction switching means, the delivery main roller feed the document introduced into the common passage of the document conveying passage to the first document receiving tray through the first branched passage when the branched passage switching means is at the first branched position and the discharging re-introduction switching means is at the discharged position, and when the branched passage switching means is at the first branched position and the discharging re-introduction switching means is at the re-introduction position, the delivery main roller feeds the document introduced into the common passage to the transparent plate through the re-introduction passage, and when the branched passage switching means is at the second branched position, the delivery main roller feeds the document introduced into the common passage to the second document receiving tray through the second branched passage.

7. The automatic document conveying device of claim 6 in which a plurality of guiding protrusions are provided in the widthwise direction on the inside surface of the first opening-closing member, and when the first opening-closing member is at the closed position, the guiding protrusions are positioned between the branched passage switching means and the discharging re-introduction switching means to define part of the first branched passage of the document delivering passage.

8. An automatic document conveying device of claim 6 in which a delivery auxiliary roller cooperating with the delivery main roller is disposed in the common passage of the document conveying passage, a biasing spring for bringing the delivery auxiliary roller into press contact with the delivery main roller and a press-contact releasing means for moving the delivery auxiliary roller in a direction to isolate it from the delivery main roller against the action of the biasing spring are provided, when the first opening closing member is at the closed position, the delivery auxiliary roller is maintained in press contact with the delivery main roller by the action of the biasing spring, and when the first opening-closing member is held at the open position, the action of the press-contact releasing means maintains the delivery auxiliary roller in an non-acting state whereby the delivery auxiliary roller is isolated from the delivery main roller.

9. The automatic document conveying device of claim 8 in which the press-contact releasing means is provided with a press-contact releasing lever pivotably mounted thereon, a biasing means for moving the delivery auxiliary roller in a direction to isolate it from the delivery main roller is linked to the press-contact releasing lever, when the first opening-closing member is held at the open position, the action of the biasing means causes the press contact releasing lever to act on the delivery auxiliary roller to isolate the delivery auxiliary roller from the peripheral surface of the delivery main roller whereby the press-contact between the delivery main roller and the delivery auxiliary roller is released, and on the other hand when the first opening-closing member is held at the closed position, the first opening-closing member acts on the press-contact releasing lever to isolate the press contact releasing lever from the delivery auxiliary roller, whereby the delivery auxiliary roller is brought into press contact with the peripheral surface of the delivery main roller by the action of the biasing spring.

10. The automatic document conveying means of claim 6 in which a re-introduction in auxiliary roller cooperating with the delivery main roller is disposed in the re-introduction passage, and the re-introduction auxiliary roller is rotatably mounted on the second opening-closing member.

11. An automatic document conveying device to be applied to an image-processing machine in which a transparent plate on which to place a document to be processed is disposed on the upper surface of a housing, which comprises
    a document table,
    a document introduction passage extending from the document table to one end edge of the transparent plate,
    a document receiving table,
    a document delivering passage extending from the other end edge of the transparent plate to the document receiving tray,
    a document delivering means for delivering a plurality of documents placed on the document table one by one to the document introduction passage,
    a document introduction means for introducing the document delivered to the document introduction passage onto the transparent plate,
    a document conveying means for conveying the document along the transparent plate, and
    a document delivering means for discharging the document delivered to the document delivering passage by the document delivering means to the document receiving tray through the document delivering passage; wherein
    the document delivering means is provided with a main roller to be rotatably driven in a predetermined direction and an auxiliary roller cooperating with it,
    a biasing spring for bringing the auxiliary roller into press contact with the main roller and a press-contact releasing means for moving the auxiliary roller in a direction to isolate it from the main roller against the action of the biasing spring,
    an opening-closing member is mounted openably and closably to define part of the document delivering passage, and
    when the opening-closing member is held in the closed state, the auxiliary roller is maintained in press contact with the main roller by the action of the biasing spring, and when the opening-closing member is maintained in the open state, the action of the press-contact releasing means maintains the auxiliary roller in a non-acting state whereby it does not substantially act on the main roller.

12. The automatic document conveying device of claim 11 in which the press-contact releasing means is provided with a press-contact releasing lever pivotably mounted, the press-contact releasing lever is connected to a biasing means for moving the auxiliary roller in a direction to isolate it from the main roller, when the opening-closing member is held in the open state, the press-contact releasing lever acts on the auxiliary roller to isolate it from the peripheral surface of the main roller thereby releasing the press-contacting state between the main roller and the auxiliary roller, and on the other hand when the opening-closing member is held in the closed state, the opening-closing member acts on the press-contact releasing lever to isolate it from the auxiliary roller, and thus, the auxiliary roller is held in press contact with the peripheral surface of the main roller by the action of the biasing spring.

13. An automatic document conveying device to be applied to an image-processing machine in which a transparent plate on which to place a document to be processed is disposed on the upper surface of a housing, said automatic document conveying device comprising a document table, a document introduction passage extending from the document table to one end edge of the transparent plate, a first document receiving tray, a second document receiving tray, a document delivery passage including a common passage extending from the other end edge of the transparent plate, a first branched passage extending from the downstream end of the common passage to the first document receiving tray, and a second branched passage extending from the downstream end of the common passage to the second document receiving tray, a branched passage switching means to be selectively held at a first branched position for allowing the common passage in the document delivering passage to be in communication with the first branched passage and at a second branched position for allowing the common passage to be in communication with the second branched passage, a re-introduction passage branching from the first branched passage and extending to the other end portion of the transparent plate, a discharging re-introduction switching means for selectively positioning at a discharge position for discharging the document advanced into the first branched passage to the first document receiving tray through the first branched passage and a re-introduction position at which the document advanced into the first branched passage to the re-introduction passage, a document delivering means for delivering a plurality of documents placed on the document table one by one to the document introduction passage, a document introduction means for introducing the document delivered into the document introduction passage into the transparent plate, a document conveying means for conveying the document along the transparent plate, and a document discharging means for discharging the document delivered to the common passage of the document delivering passage by the document conveying means to the first document receiving tray through the common passage and the first branched passage of the document delivering passage, or to the transparent plate through the common passage, the upstream portion of the first branched passage and the re-introduction passage of the document delivering passage, or to the second document receiving tray through the common passage and the second branched passage of the document delivering passage; wherein one side of at least a greater portion of the first branched passage and one side of at least a greater portion of the second branched passage are defined by a first opening-closing member mounted pivotably between an open position and a closed position, the other side of at least a greater portion of the first branched passage of the document delivering passage and one side of at least a greater portion of the re-introduction passage are defined by a second opening-closing member pivotably mounted between an open position and a closed position, when the first opening-closing member is held at the open position, at least a greater portion of the first branched passage and at least a greater portion of the second branched passage are opened, and when the second opening-closing member is maintained at the open position while the first opening-closing member is held at the open position, at least a greater portion of the re-introduction passage is opened, the discharge re-introduction switching means is pivotably mounted on the second opening-closing member, a part of its upper surface defines the other side of a part of the first branched passage in the document delivering passage, a part of its under surface defines the other side of a part of the re-introduction passage, and when the first opening-closing member is held at the open position and in this state, the discharge re-introduction switching means is pivoted in the opening direction, a part of the re-introduction passage is opened, a guiding member is disposed in relation to the discharge re-introduction switching means, when the first opening-closing member is maintained in the open position and in this state the second opening-closing member is pivoted toward the open position, a part of the discharge re-introduction switching means is guided by the guiding member to hamper the pivoting movement of the discharge re-introduction means in a predetermined direction, the document delivery means having provided therein a delivery main roller to be rotated in a predetermined direction and a re-introduction auxiliary roller to be rotated around a rotating shaft in cooperation with delivery main roller, the discharge re-introduction switching means, in the state where the first opening-closing member is held at the open position, has provided therein a revolving restriction member abutting the rotating shaft of the re-introduction auxiliary roller or a member provided in juxtaposition therein as the discharge re-introduction switching means revolves in an opening direction around the supporting shaft, the range of revolution restriction of the discharge re-introduction switching means by the revolution restricting member is prescribed within such a range that when the revolving external force is released, the discharge re-introduction switching means can pivot and return to a closed position by its own weight, the rotating shaft of the re-introduction auxiliary roller is provided so that it is movable in a direction apart from the supporting shaft of the discharge re-introduction means, whereby the rotating shaft or a member provided in juxtaposition on it may be moved out of the revolving locus of the discharge re-introduction switching member.

* * * * *